US012585138B2

(12) United States Patent
Kaiser

(10) Patent No.: US 12,585,138 B2
(45) Date of Patent: Mar. 24, 2026

(54) APPARATUS AND METHODS FOR DISPLAYING THREE DIMENSIONAL IMAGES

(71) Applicant: Michael Kaiser, Munich (DE)

(72) Inventor: Michael Kaiser, Munich (DE)

( * ) Notice: Subject to any disclaimer, the term of this patent is extended or adjusted under 35 U.S.C. 154(b) by 445 days.

(21) Appl. No.: 18/199,432

(22) Filed: May 19, 2023

(65) Prior Publication Data

US 2023/0375850 A1     Nov. 23, 2023

Related U.S. Application Data

(60) Provisional application No. 63/343,816, filed on May 19, 2022.

(51) Int. Cl.
*G02B 30/50*          (2020.01)
*G02B 6/06*           (2006.01)

(52) U.S. Cl.
CPC ............... *G02B 30/50* (2020.01); *G02B 6/06* (2013.01)

(58) Field of Classification Search
CPC .................................. G02B 30/50; G02B 6/06
USPC ........................................................ 359/462
See application file for complete search history.

(56) References Cited

U.S. PATENT DOCUMENTS

| | | | |
|---|---|---|---|
| 6,128,132 A | 10/2000 | Wieland et al. | |
| 8,294,987 B1 | 10/2012 | van Muland | |
| 2006/0251365 A1 | 11/2006 | Brewer | |
| 2008/0170293 A1 | 7/2008 | Lucente et al. | |

FOREIGN PATENT DOCUMENTS

| | | | | |
|---|---|---|---|---|
| CN | 106598367 | 6/2019 | | |
| DE | 102020001685 A1 * | 6/2021 | ............. | G02B 30/50 |
| KR | 20180058581 | 10/2018 | | |

OTHER PUBLICATIONS

German patent application 10 2020 001 685.5 Search Report Mar. 13, 2020 with English translation.

* cited by examiner

*Primary Examiner* — Bumsuk Won
*Assistant Examiner* — Mitchell T Oestreich
(74) *Attorney, Agent, or Firm* — Joseph E. Maenner; Maenner & Associates, LLC

(57) ABSTRACT
Exemplary arrangements include devices that are operable to output three-dimensional images. Such devices may utilize a matrix of relatively movable light guides. The light guides are utilized to display visual images therethrough and may also be selectively movable axially to provide three-dimensional contours to displayed images. Other exemplary arrangements may utilize a matrix of light guides or similar structures that are displaceable, to provide inputs that can be correlated with data or other information and utilized for various purposes. Other exemplary arrangements may be utilized to provide visual representations corresponding to audible signals or other signals to provide improved multi-sensory experiences. Devices and methods of the types described can be utilized in many different contexts and applications to provide benefits and useful results.

23 Claims, 22 Drawing Sheets

63

62

570

202

APPARATUS AND METHODS FOR DISPLAYING THREE DIMENSIONAL IMAGES

CROSS-REFERENCE TO RELATED APPLICATION

The present application claims the benefit of U.S. Provisional Patent Application Ser. No. 63/343,816, filed on May 19, 2022, which is incorporated herein by reference in its entirety.

TECHNICAL FIELD

Exemplary arrangements relate to devices and methods for displaying three-dimensional images. Other exemplary arrangements relate to devices and methods for receiving inputs and data. Exemplary arrangements further relate to uses for such devices. The invention relates to a device and a method for displaying three-dimensional images having a plane in which a plurality of pins are movably arranged perpendicular to the plane as light guides, one side of the plurality of pins representing the image, and an imaging device, and a use of such a device.

BACKGROUND

Prior devices for displaying three-dimensional images are known. Often special glasses or complicated mechanisms are required for the operation of such devices. A generic device is described in U.S. Pat. No. 6,462,840 B1. In this case, however, it is costly to first decompose the image information into pixels, and the quality of the reproduced image usually suffers from this process step.

Similar figures are shown in US 2009/0009301 A1, KR 10 2018 0 058 581 A and US 2012/0279812 A1.

Prior devices may benefit from improvements.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Exemplary arrangements relate to devices and methods that may be utilized to display three-dimensional images. Other exemplary arrangements relate to devices and methods for receiving inputs and data. Further exemplary arrangements demonstrate the utilization of such devices and methods.

Since the imaging device is a projector or a screen, an image can be projected onto the other side of the plurality of pens. The pens are close to each other depending on the resolution required and each pen relays a portion of the image projected onto the plurality of pens.

An image or a film with constantly changing images can be projected onto the pens. Light from the visible light spectrum or from another spectrum, such as the infrared or ultraviolet spectrum, can be used for the projection.

Thus, the surface of the plurality of pins on the side of the projector 5 can have an inverse shape and on the other side, the surface of the pins shows the image projected on the back side thereof and forms a defined surface that can change continuously and, in particular, can adapt to the projected image.

The projector 5 or screen can use visible light, OLED or LED.

In addition, an emitter, such as in particular an infrared emitter, can be arranged on the side of the projector, which is directed at an object such as the hand of a user, so that the reflection on the object causes as an image on the other side of the pins. For example, infrared diodes on the side of the projector 5 provided on the side of a frame of the device can be used to project light onto a finger of an operator, causing an image to be captured through the pins on the other side thereof.

Different radiation spectra thus allow different images to be produced in particular radiation spectra, respectively. For example, a visible image can be generated in the visible light radiation spectrum or a film can be run and, at the same time, an image of infrared radiation can be generated in an infrared radiation spectrum that conveys information about the proximity of a finger to the rods.

The finger that reflects the infrared light is then the projector 5 used as the imaging device. This enables motion detection on a touchscreen, for example. For this, a defined radiation is applied to the object, such as a finger or a hand or a pen, and the reflection of the radiation is detected and evaluated as an image on the other side of the pen, for example to determine the position of the object.

The object can be arranged at a distance from the plurality of pins. However, it can also be placed on top of the pins. In this case, the thermal radiation of the object can be detected and evaluated as an image on the other side of the plurality of pins. For example, the user's body temperature can be detected and determined by hand placement. The analysis of the image can be performed, for example, with an infrared depth camera that scans the fiber optic matrix.

Advantageously, an application in which the input about the individual displacement of each of the plurality of pins is used to generate a pressure profile. Such a pressure profile can be used to generate an individual surface such as a wheelchair cushion or a shoe insole. For example, the plurality of pins can be used to capture the bottom of a foot as a 3D point cloud and, if necessary, revise it and display it on a monitor before it is used to provide data to a 3D printer.

Ultraviolet light, particularly in the spectral range between 280 nm and 315 nm can additionally be used to disinfect a fiber optic surface or objects placed on the fiber optic surface.

The use of laser light, especially in a range of 280 nm to 1 mm for projection onto the light guides opens up further possibilities.

In addition to an image or a film, unguided light from any spectrum, i.e., optical directional radio, can be used to pass data onto and then through the optical fibers. Laser projection and video projection can also be mixed to create novel visual effects.

A directed laser light beam can also be used to apply a pressure pulse to a pen to produce movement of the pen.

To analyze the image on the other side of the plurality of pens, the relief of the pens can be scanned with a laser scanner.

The device may also be connected to a network. This is preferably implemented via the Internet, Bluetooth or WLAN. This allows several such devices to be connected to each other, for example, to transmit a movement of pens of a first device to a movement of pens of another device, or to move pens by network signals.

For example, data from images taken with a smartphone or multi-dimensionally captured objects such as objects scanned with lidar can be transmitted to such a device to cause a corresponding or even true-to-scale representation on the surface of the plurality of pens.

BRIEF DESCRIPTION OF DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figures 1, 2:
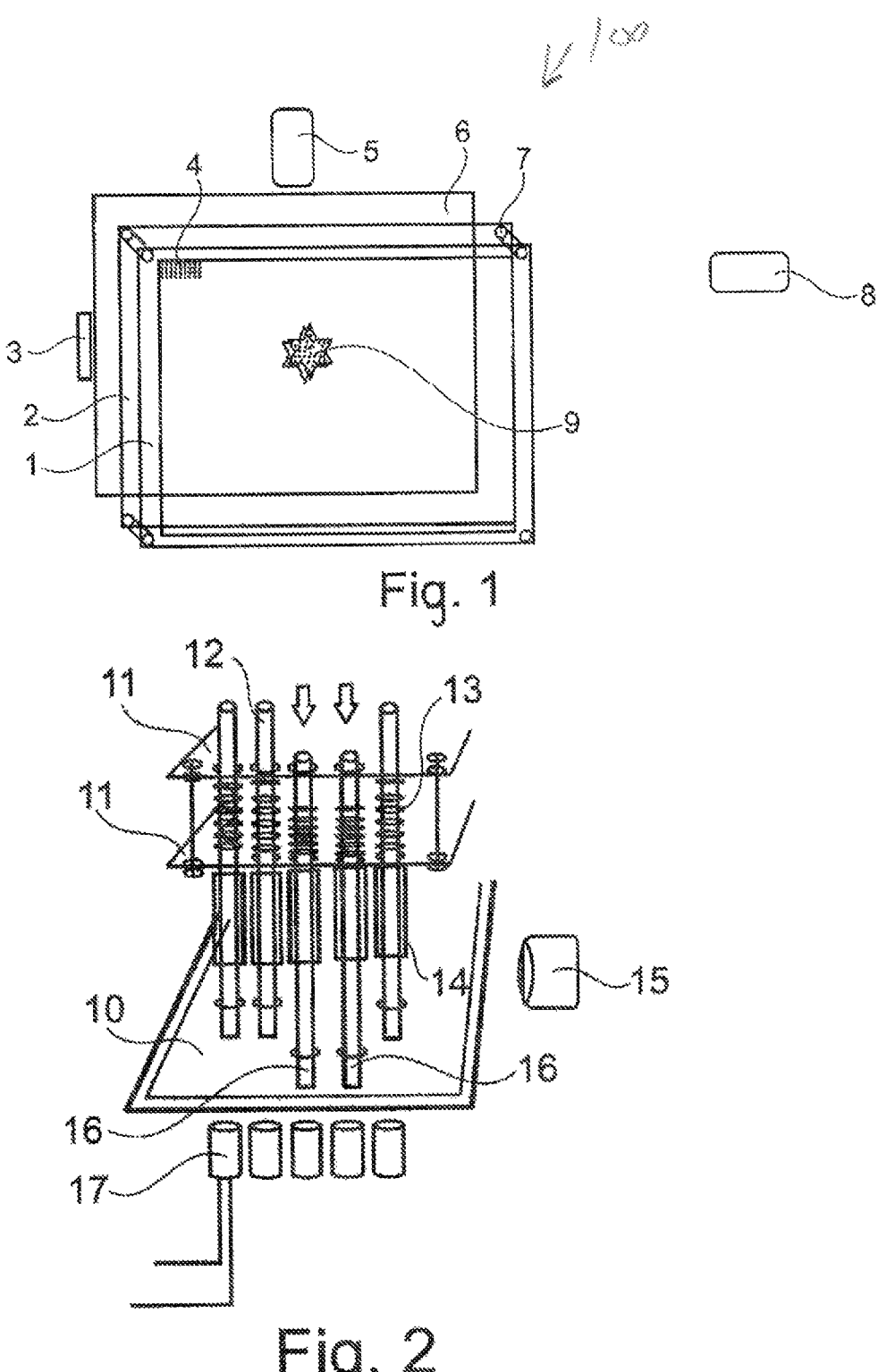
FIG. 1 shows a device with two shadow masks and two projectors.
FIG. 2 shows a detailed view of components utilized in the device shown in FIG. 1.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence Exemplary arrangements of the present invention may be utilized for purposes of providing three-dimensional (3D) outputs as well as for receiving 3D inputs, positional inputs and data.

Exemplary arrangements make it possible to display video and images in three dimensions. Further exemplary arrangements enable the representation of audible and other signals as three-dimensional outputs.

Further exemplary arrangements make it possible to convert applied pressure across a three-dimensional space into data which may be utilized and transmitted. Such arrangements make it possible to convert data into motion.

Further in exemplary arrangements the configuration of contoured surfaces can be converted into data that may be saved and transmitted.

Further exemplary arrangements provide for the synchronization of video outputs and 3D movement of surfaces on which the video outputs are presented.

Further exemplary arrangements may be utilized for purposes of providing a programmable game course in a graphic a three-dimensional form. This enables playing new types of games. This can include providing inputs that correspond to game figures and utilizing such figures in the playing of games.

Further exemplary arrangements can enable blind people to grasp or feel output three-dimensional shapes. Additionally exemplary arrangements may enable blind people to change a three-dimensional surface by applying pressure and thereby provide inputs and record data synchronously with three-dimensional outputs.

In an exemplary arrangement the projection of a short distance output device providing illuminated beams or similar visual outputs is projected onto a mirror. Opposite the mirror the projected image is reflected onto a matrix of height adjustable light guides. This enables a visual display of static or video images on the front of the device.

In the exemplary arrangement the light guides are height adjustable responsive to control signals which are provided by the at least one programmable controller.

Exemplary devices may be operated with a projector or a screen. In some exemplary arrangements the projector may include a laser projector.

In some exemplary arrangements in which the principles described herein are utilized in connection with an input device, a user may press his or her hand, for example, on out ends of spring-loaded light guides. The inward ends of the light guides are magnetic or ferromagnetic. This creates a measurable induction signal, analogous to that used with an electronic balance. In such exemplary arrangements the measured data can be transmitted to a second device. The second device may operate to display the information that is received in the form of an image or other perceivable outputs.

Such arrangements make it possible to build a 3D avatar, to provide video telephones with 3D face representations, to provide 3D advertisements, to conduct 3D modeling and animation, to provide gaming table and/or geographic 3D terrain representations, to provide 3D representations of architectural features, to provide 3D representations that may be perceived via touch by blind users as well as sighted users (for example presenting contours of faces, chess pieces or other objects), to provide 3D illustrations and representations of results that are generated through artificial intelligence, to provide input functions based on pressure applied to movable arrays of indicators, to provide inputs suitable for training of artificial intelligence software in computer networks, to generate and save data corresponding to contoured surfaces such as reliefs and to provide comprehensible haptic or haptic enhanced outputs, and to provide perceivably moving three-dimensional video and other graphic outputs.

Some exemplary arrangements may utilize recycled plastic materials in production of the structures. Such recycled materials may include recovered plastics from PET bottles, for example.

In an exemplary arrangement in which a device 100 utilizing the principles described herein is used for scanning purposes, as shown in FIG. 1, a user may press an object into extended elements of a light guide matrix 4. For example, in some arrangements a user may press a body part such as a hand or face into the exposed ends of the elements of the extended light guide matrix 4. In other arrangements, a solid device, such as a star, can be pressed into light guide matrix 4 to generate a star pattern 9 through a perforated shadow mask 2 onto a shadow mask 1, which are separated from each other by spacers 7. A mirror 6 is located behind perforated mask 2. The displacement produced by the engagement of the matrix elements 12 is measured by sensors that produce data that can be rendered as a visible image from a projector 5 or a projector 8 on a two-dimensional video display or other output device. Further the data obtained from the displacement of the matrix elements can be reproduced such as through output devices or via 3D printing.

These principles described in connection with the displacement of the elements of a matrix of extendable light guides 12 may also be utilized for purposes of measuring objects. For example in some arrangements the dimensions and configuration of a workpiece may be measured and analyzed.

In some further arrangements a projected infrared grid 3 may be utilized for interaction with a user in a manner similar to a touchscreen. For example, an infrared grid 3 may be projected from behind the display through light guides rods in matrix 4. Alternatively the matrix 4 may be projected onto the visible side of the display from the front.

Further if the user makes a selection to provide a three-dimensional output from the device using the described features, a 3D animated image can be produced. Such an image can be produced so as to include a plurality of areas and surfaces that protrude outward from a surface positioned behind the forward protruding ends of the display elements included in the matrix. Further in some arrangements a selection may be made to provide selectively either two-dimensional display outputs or three-dimensional display outputs from the display device.

In arrangements where the principles described herein are used in connection with input devices, force applied to the various matrix elements may be measured based on contact force which acts on each of such elements across a multi-element sensing region. The strength of the pressure that acts on each element may be measured stored and transmitted to other devices. The detection of such forces in this manner enables the real time transmission of detected force to other devices.

Further exemplary arrangements may include devices that can be operated in such a way that the devices are operated from the inside, and without a second projector 5 or 8. This provides that an LED or an OLED screen can also be displayed during the daylight. Such a display may be perceived even when there is a high level of ambient light. This may provide a cheaper alternative to LED operated 3D displays.

In some exemplary arrangements if a three-dimensional geometric figure is equipped to present LED outputs, the images presented on the three-dimensional geometric figure can only achieve a pixel resolution that is the same as the particular output device with great effort. This is because a light guide is not in a single color but instead entire parts of the projected image surface of the display device will be visible to a user.

In exemplary arrangements LED indicator sticks may be utilized. LED indicator sticks having five sides may be advantageous. Such indicator sticks may serve as controllable surfaces. This is useful compared to film displays, as LED indicator sticks can change the image via selected movement thereof through magnetic control or other controlled movement toward or away from a viewer. Such approaches are advantageous compared to film displays which are static and rigid by comparison.

Exemplary arrangements may also provide 3D projection technology. Such arrangements enable projection onto and through a matrix of movable light guides. In some exemplary arrangements the image projected through a light guide is projected through a screen, with elements of the image being presented at a forward surface of the light guide. Further in some exemplary arrangements a better 3D representation of the visual outputs is achieved with greater sharpness and clarity, by adding the portions of the image that are not present at the outer face of the light guides through a second projection of the image onto the device from the front of the device.

The sharpness of an image that is presented may become worse due to the different distance between the light guides and the projection surface that is behind the faces of the light guides. In the case of model projection surfaces, depressions can become blurred. To compensate for this lack of clear focus in some regions, a software analysis can be conducted to provide image manipulation to compensate for those blurred regions that would otherwise be produced within the image.

Figure 3:
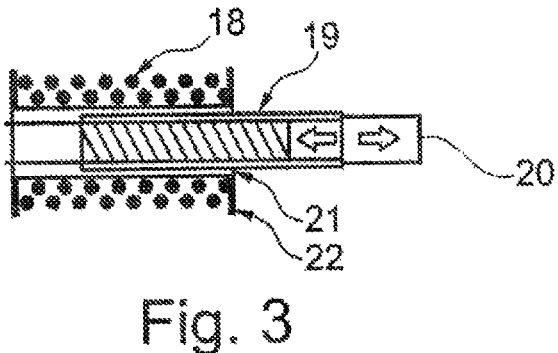
FIG. 3 shows an exemplary mechanism for moving a light guide in the device of FIG. 1.

Referring to FIG. 2, in exemplary arrangements computer-based control is provided so that each individual light guide 12 is included in a matrix. Light guides 12 extend between at least two electronic circuit boards 11, with a mirror 10. A detail 14 of light guides 12 is shown in FIG. 3. Copper coils 18 or other types of electrically operated actuators are installed in between the circuit boards. In exemplary arrangements a graphics card or similar electronic circuitry may control the positions of the light guides 12 so as to synchronize the light guides 12 with the projected graphics. Such arrangements provide for synchronized movement of the image in a direction transverse to the base plane of the projected images from a projector 15.

In some exemplary arrangements electromagnets 17 positioned behind mirror 10 may be utilized to provide control of magnetically attractive light guides 16 that are activated by electromagnets 17. Such movement of the matrix elements may be utilized to provide contours corresponding to large area movement patterns. Such patterns may correspond to movements toward the viewer that corresponds to visually presented features. These may include for example the punching of a fist, objects being knocked away from the current position toward the viewer, etc.

Referring to FIG. 3, light guides 20 are housed in a driving core 19, with bearings 21 supporting the driving core 19 in a spool carrier 22.

In exemplary arrangements biasing mechanisms may be utilized for purposes of maintaining the light guides 12 which make up the matrix in a common initial base position. Such biasing mechanisms may include coil springs 13 or other types of springs or resilient members. This enables the light guides 12 that are included in the matrix to be in a base position when the device 100 is off.

The use of biasing mechanisms in connection with the light guides 12 which comprise the matrix can also be utilized in connection with arrangements which are used to measure forces that are applied to the matrix elements. In alternative arrangements biasing devices such as resilient members or a foam mat may be utilized as a biasing mechanism for the movable matrix elements.

In other alternative arrangements the movable matrix elements may be configured to undergo movement generally horizontally. In such arrangements the need for a biasing mechanism to hold each of the light guide elements 12 in a particular displaced or undisplaced position may be avoided.

The circuitry utilized for controlling the positions of the light guides 12 which make up the matrix elements may also be achieved in exemplary arrangements through the utilization of a matrix sandwich which does not interfere with the controlled movement of each matrix element. Further in some exemplary arrangements a third perforated plate that can be easily moved and locked, may enable a shape to be held statically and to be maintained on a relatively permanent basis without the need to utilize electricity to hold the matrix elements in selected output positions.

For example, in some exemplary arrangements contour data may be captured for an object or a subject. This enables the contours of the object or subject to be detected through sensors and input to the device. Such data that is obtained in this manner may be utilized to enable the texture and/or shape properties to be output in a manner that provides a 3D contoured visual representation of the device. Such contour data may be output corresponding to objects such as a human face, a clock or other object having multidimensional contours.

Figure 4:
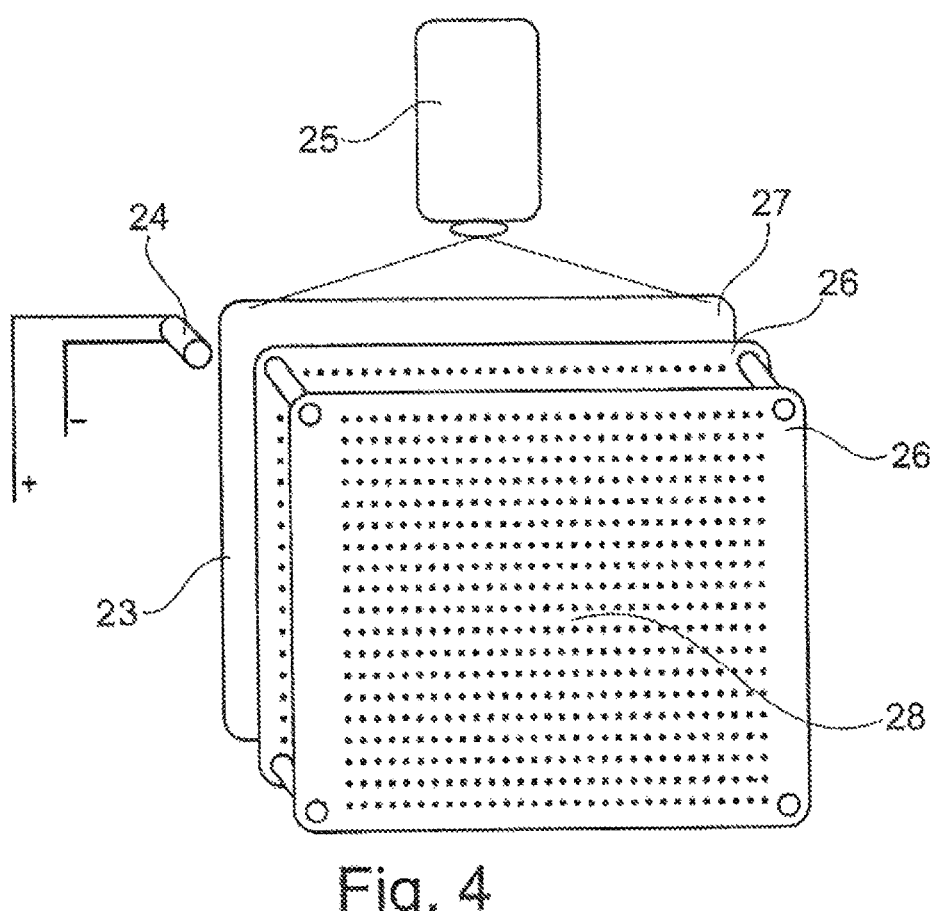
FIG. 4 shows an exemplary device with two shadow masks and a projector.

FIG. 4 shows an exemplary embodiment of a system having parallel masks 26 with a display surface 28 at the front of the first mask 26 and a mirror 23 behind the second mask 26. /an electromagnet 24 controls light rods (not shown), with a projector 25 projecting onto projection surface 27 of mirror 23.

Figure 8:
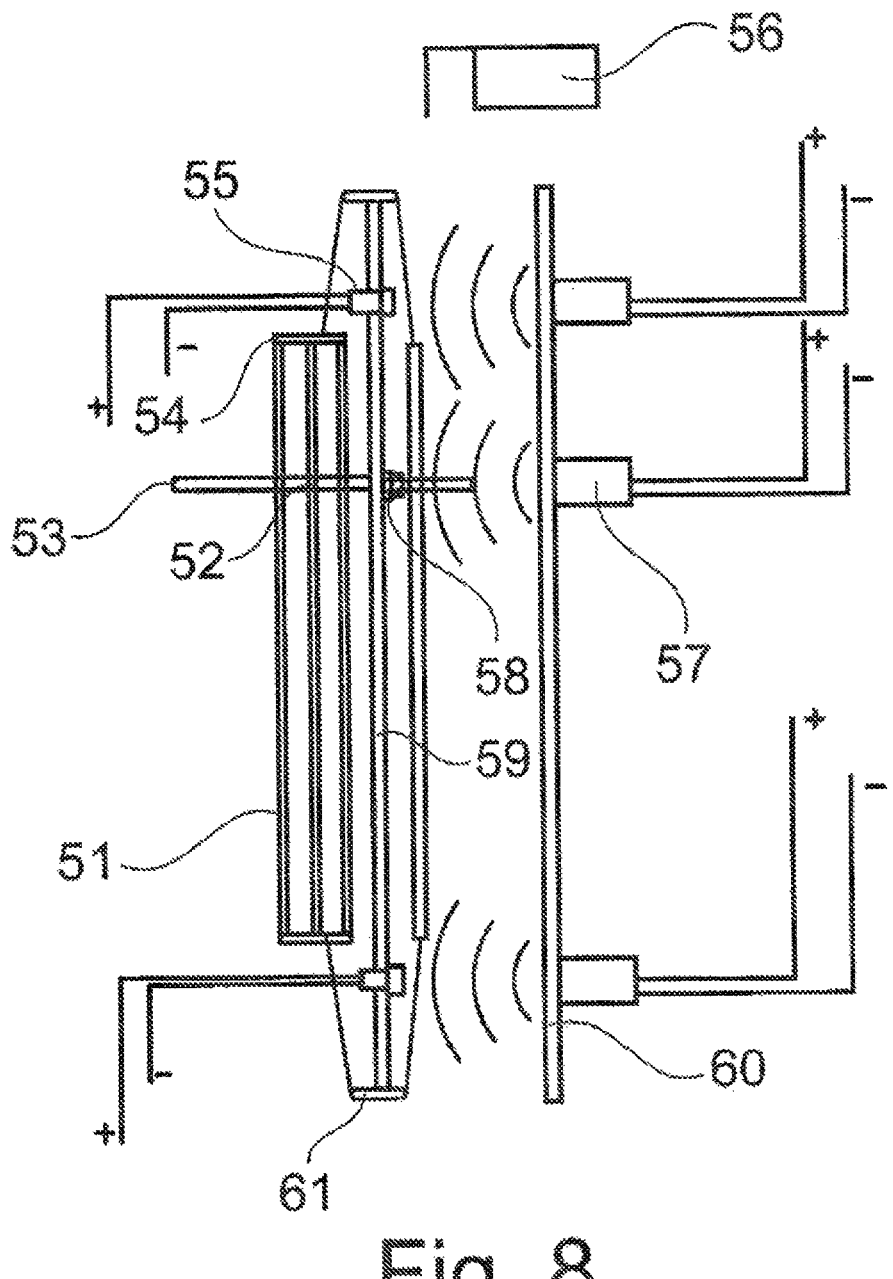
FIG. 8 is a side view showing a device with a light guide rod suspended from a membrane.

In some exemplary arrangements, as shown in FIG. 8, a piezoceramic brake 52 may be utilized in connection with matrix elements 53. Such a brake 52 may enable holding or releasing each respective element 53 in order to build up a relief corresponding to surface contours utilizing the sensing of magnetic properties associated with sensed elements that are in operatively attached connection with at least a portion of each of the matrix elements 53.

Figure 5:
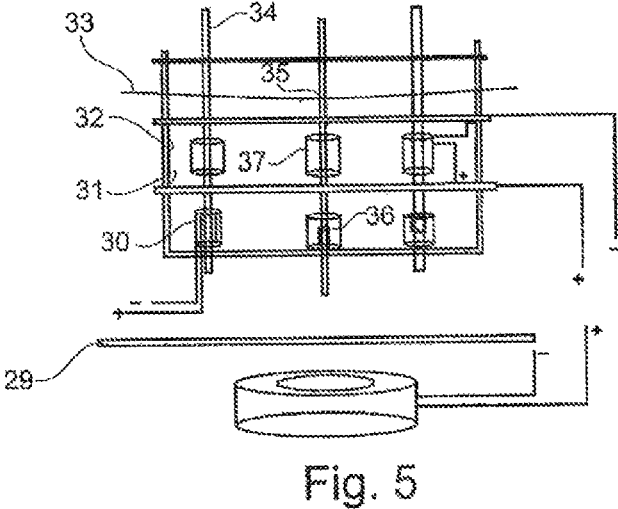
FIG. 5 shows an exemplary device that utilizes a rubber membrane.
Figure 6:
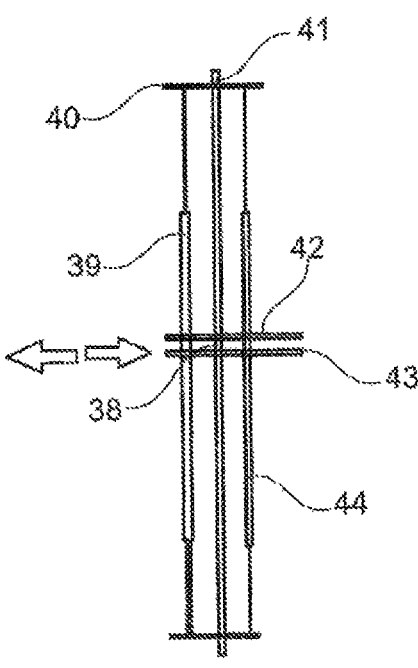
FIG. 6 shows a section through a representation of light guides that are connected via membranes.
Figure 7:
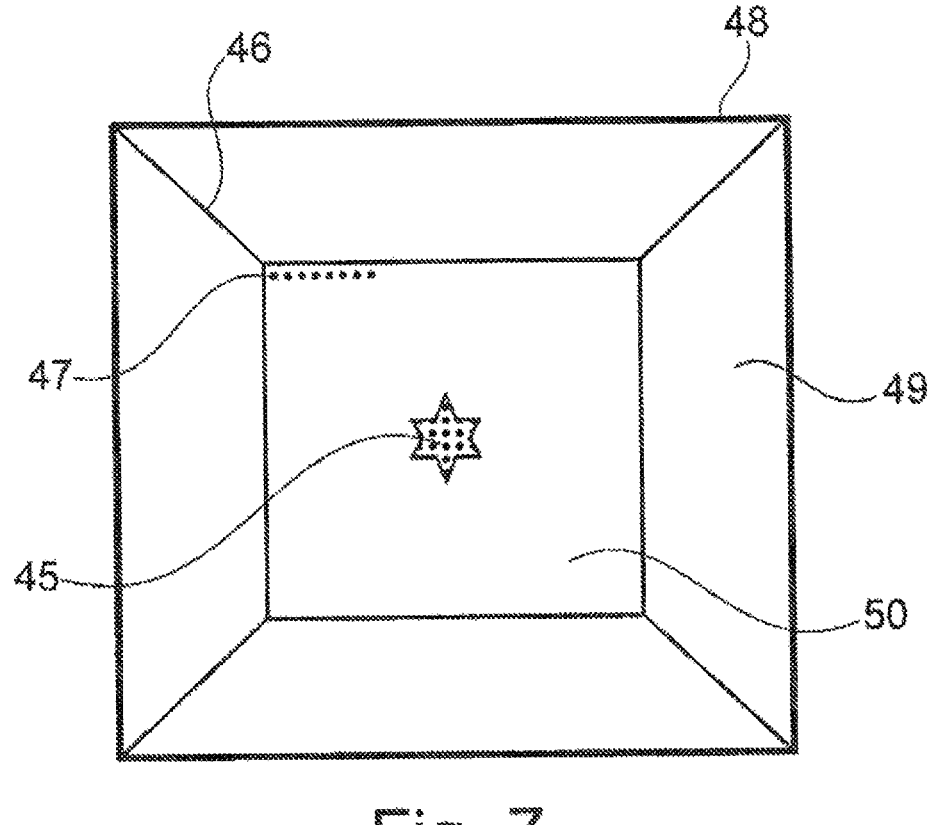
FIG. 7 is a plan view of the device shown in FIG. 6.

In some arrangements, instead of using spiral springs, as shown in FIGS. 5-7, a rubber membrane 33 may be utilized for purposes of biasing the light guides 34 through shadow masks 31, which are separated by spacers 32. A mirror 29 is located below the masks 31.

A ferromagnetic sleeve 30 formed from copper coils 36 is wrapped around each light guide 34. In such arrangements the light guides 34 may be attached to the rubber membrane 33 at a point 35 by gluing or other attachment methods. A piezoceramic brake 37 wraps around each light guide 34 between shadow masks 31 and is used to secure light guides 34 to desired positions.

Referring to FIG. 6, unsecured light guides 42 and secured light guides 43 extend through shadow masks 39, 44, with a rubber membrane 41 extending between the masks 39, 44. Secured light guides 43 are secured to rubber membrane 41. Spacers 40 separate masks 39, 44.

In the embodiment of FIG. 7, spacers 46 with stenter frame 48 separate a shadow mask 50 from a 3D display area 45. In some arrangements light guide elements 47 are attached to stretched rubber membranes 49, one line behind the other. In an exemplary arrangement, every second light guide 47 is glued and attached to the second rubber membrane. This approach may be utilized to ensure that the light guide 47 in closest proximity to another light guide 47 is not set in motion or displaced as a result of movement of the first adjacent light guide 47. This result can be achieved because the immediately adjacent light guide is attached to a different membrane. In exemplary arrangements the rubber membrane 49 should protrude beyond the shadow mask 50 in order to ensure a soft elasticity to the perimeter of the mask 50 and so that light guides 47 may be selectively displaced responsive to less magnetic force than would otherwise be required.

Further in some exemplary arrangements the rubber membranes 49 to which light guides 47 are attached can be made to selectively vibrate. This may be accomplished for example by utilizing a motor connected to an oscillatory element. Such vibration properties may be utilized to enhance motion effects. For example such an arrangement may be utilized to bring a video or static image of water waves into harmony with vibrating light guides 49. Of course it should be understood that this approach is exemplary and in other arrangements other approaches may be used.

In some arrangements a ferromagnetic sleeve 30 may make it possible to selectively position light guides 34 without magnets on each light guide 34. The avoidance of magnets in some arrangements reduces the risk that the magnetic flux associated with movement of one light guide 34 may influence other light guides 34. The utilization of ferromagnetic sleeves 30 attached to the light guides 34 behind the perforated plate through which light guides 34 extend and are supported in some arrangements, facilitates the recording and reproduction of the desired positioning of and sensing of light guides.

In some exemplary arrangements movement of light guides can be generated with several membranes lying one behind the other, like a string instrument. For this purpose for example, light guides that are in attached relation with membranes can depict a three-dimensional object such as a bottle for example. A video can be created by moving a bottle forward which can be output and accentuated by movement of the light guides attached to rubber membranes.

The entire rubber membrane can also be used as a tensioning frame with predetermined attached light guide rods 47 which are moved forward toward the viewer in order to present 3D movement.

With a 3D camera for example, a face of a user can be captured and displayed as a 3D relief on an exemplary device. The exemplary movable projections may provide a contoured surface which has a resolution several times higher than that of known methods. This enables the shape of more detailed objects to be presented. These may include for example fine reliefs, landscape representations or other contoured representations which enable more precise 3D images and/or reproduction with more filigree representations.

The 3D effect is created by axially movable light guides which act as light columns. These light guides are movable at a selected height toward and/or away from the viewer or in any otherwise visually perceivable manner. In some arrangements a light guide cannot only display one or three colors such as RGB LED colors, but in some arrangements entire projection fragments (like no picture displays).

In some arrangements light guiding or not light guiding building blocks can also be attached to light guides for purposes of modeling, animating, moving or illuminating a presented visual figure. For example, for new types of games, figures may be presented which correspond to luminous moving chess pieces, or other gaming graphics. Further in other arrangements representations may be provided of mechanically driven models. This may include for example movement of components within an internal combustion engine or devices in which movable elements can be represented by outputs of moving matrix elements which provides 3D contoured outputs.

Exemplary arrangements may have multiple different forms. For example devices may be provided without control of light guide movement. In such arrangements light corresponding to images may be projected via a projector 56 directly onto the back of the elements included in the light guide matrix 4. Such an approach may produce a plastic 3D effect. This can be done with or without contours produced by varied positions of the light guide elements 53. Such approaches may also be accomplished without the use of mirrors 60 and without height differences between the light guides 53. Such an arrangement may be utilized as an accessory for projection devices.

Alternative approaches which provide magnetic control of the positions of light guides included in the matrix, and projection via mirrors 60 may be utilized. In such arrangements magnetic fields or other positioning actuators may be utilized in proximity to magnetically movable light guides 53. In such arrangements the mechanisms for moving the light guides 53 may be provided without disturbing the projected images. Mechanisms for moving and positioning the light guides 53 that have been previously described, including the spring mechanisms and the like, may be utilized for such purposes. Of course it should be understood that these approaches are exemplary.

In further arrangements the use of a larger display and a 10 point multitouch screen enables the playing of games such as "Plasma Pong" on a multitouch screen in two-person mode. In such arrangements this play of colors with an added depth effect provides colorful, three-dimensional clouds of color. Such an arrangement provides an effective demonstration of the capabilities that can be provided through the use of the approaches described herein.

Other exemplary arrangements can provide display devices which provide a pop up 3D display. Such devices may provide a three-dimensional representation for the pop-up elements. As a result the contours that are generated by the varying displacement of the matrix elements associated with the pop-ups enhance the perception of the pop-up graphics and messages.

Exemplary arrangements provide the projection of images though a light guide matrix in which the axial positions of the light guides along the direction of movement are each selectively controlled. As a result the image that is projected through the light guides from the inside to the outside produces a variable 3D effect. In some arrangements a glowing three-dimensional effect on a flat surface is also achievable. The effect of luminosity of a video image may be created in some arrangements through the use of a shadow mask having a black front. Due to the transparency of the light guides, a viewer sees the light deep down, where the light is separated by the perforated black mask. The further distance that the light guides protrude outward from the shadow mask, the stronger the effect. In order to achieve a better projection including surface contours, circuitry with 3D mapping software can be utilized in some arrangements. Objects that are transparent or opaque can also be embedded on light guides in order to decorate or supplement the graphics that are produced. For example a smartphone can be embedded with its display for presentation at a trade fair.

In accordance with further arrangements exemplary display devices can be equipped with a transparent display such as an LED or and OLED display. In such arrangements an image is displayed via the light guides to provide a perception of depth concurrently as an image is displayed via the transparent display.

The principles described herein may also be utilized in at least two types of 3D touchscreens. Due to the sandwich construction of the exemplary arrangements it is possible to introduce infrared (IR) light into the light guides between the perforated plates which are sealed so as to be light tight, or for the IR light to be introduced from behind along with the projected visual image. The further a respective light guide protrudes from the black perforated plate, the more IR light is emitted by the light guide. The infrared light that is emitted corresponds to the coordinates of the respective light guide.

In alternative arrangements IR light barrier grids aligned one behind the other may also be used. In such arrangements multiple touchscreen infrared overlays can be provided one behind the other. Such multiple overlying sensing capabilities can be utilized to determine the axial position and/or displacement depth of each of the light guides.

In other arrangements it is also possible to measure the pressure applied to light guides using infrared light. In such arrangements light guides which are biased by spiral springs or other biasing mechanisms may be utilized. Thus exemplary arrangements can provide a 3D touchscreen which can also detect a pressure level in various locations corresponding to the displacement of the light guides. The strength of the IR light emitted by the light guides as detected by an IR camera may be recorded and evaluated. This enables determination by suitable circuitry of the pressure exerted on the front of the elements of the display device. Pressure detection via infrared light utilizing light guides with spiral springs or similar biasing mechanisms is also possible. In such arrangements for example the pressure that the user exerts on the light guides at the front causes the respective rear portions of light guides to move and interrupt IR light barriers which lie one behind the other. The greater the pressure, the greater corresponding displacement and the more consecutive IR light barriers that are interrupted by the displacement of the respective light guides. For example in some exemplary arrangements the value of the exerted force can be determined from the fixed spring rates associated with the spiral springs which are operative to bias the light guides. Such arrangements may be usable for calculating properties such as weight associated with an object that is operative to bias the light guides in a downward direction. Of course these approaches are exemplary and in other arrangements other approaches may be used.

In other exemplary arrangements a device can utilize scanning sensors such as those associated with augmented reality sand pits in order to determine and digitally record the contours of the surface of an object. In other arrangements other types of scanners can also be used for determining surface contours such as laser scanners, lidar scanners, radar scanners ultrasonic scanners and other scanner types that produce signals corresponding to the positions of surface segments which can then be recorded and analyzed to determine surface contours.

Figure 9:
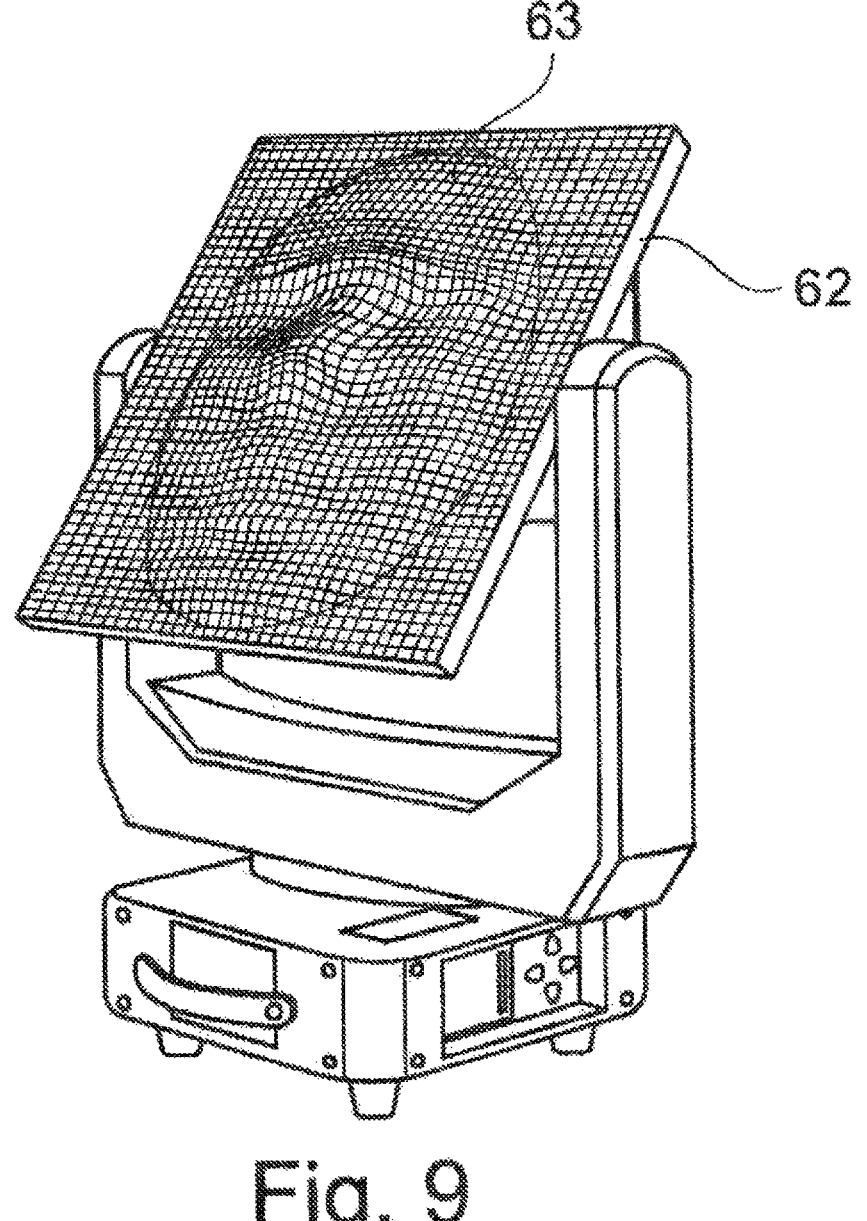
FIG. 9 shows an exemplary arrangement with a 3D display which is arranged on a tiltable suspension.

FIG. 9 shows an example of a device used for producing a virtual presence. As shown therein a representation of a face 63 can be presented on a 3D display 62. The visual representation of the face can be varied through operation of suitable circuitry. As a result the facial representation can independently turn from side to side, provide a shake of the head, have the lips thereof move so as to appear to speak, and provide other actions.

In some exemplary arrangements a large number of light guides in the form of pins or rods can be independently moved to provide three-dimensional outputs. In exemplary arrangements the pins may be selectively movable responsive to electrostatic forces. In some exemplary arrangements the light guide pins or a person who may use a body part to displace such pins, may be electrostatically charged. In this arrangement the pins may be moved as a result of the electrostatic forces that act on the pins. In some arrangements a Van de Graaff generator can be utilized to electrostatically charge the pins. This approach makes it possible to displace and move the pins without direct touch contact with the pins. Such arrangements may be utilized to provide higher relief resolution as well as new types of imaging technology. Further exemplary arrangements may provide different types of relief structures with accompanying movement and control. Further in some arrangements that provide for electrostatic movement, the arrangement of pins may be configured to be mounted on a wall or in other arrangements that provide for saving space and economical construction and operation. Of course numerous different approaches may be utilized in different arrangements.

In some exemplary arrangements for activation, nonvisible light such as infrared light or infrared laser light may be radiated onto a display surface. The receipt of such light on the display surface may be utilized to detect movement.

In some exemplary arrangements electrically conductive tracks may be applied to the perforated plates that are utilized in the matrix element supporting sandwich. Such tracks may be applied using a lithography or printing process. Such electrically conductive tracks may be utilized in connection with the actuators and sensors that are operative to move and/or detect the axial position of the individual light guides.

A perforated plate utilized in exemplary arrangements for supporting movable light guides may be comprised of several composite sandwich components. This composite sandwich construction enables providing sufficient space for the suitable conductor tracks.

In addition in some arrangements plug-in type components can be attached to a display or input device. Such plug-in type components can include electronic components such as current bridges between conductor tracks, resistors, transistors, diodes, capacitors or other circuit components.

In exemplary arrangements a display device may be provided that enables three-dimensional outputs that may facilitate assembly or construction activities. For example in some arrangements outputs may correspond to a 3D construction manual. Such outputs may include graphics with three dimensional contours. Such outputs may be utilized to indicate to a user where to connect modular electronic components that can be connected to the device to achieve selected capabilities. Such principles may also be utilized in conjunction with diagnostic or repair activities.

In some exemplary arrangements some light guides may be provided with an electrically conductive coating. Such a coating may be utilized in order to transmit electrical signals. Further in some arrangements the property of electrical conductivity may be utilized for accomplishing measurements. Further in some arrangements such conductive coatings may enable setting up the device and circuitry as appropriate through automatic operation of robots. Such robots may operate to provide assembly in remote locations including for example in outer space.

Certain current conducting light guides may include properties that enable them to function as measuring tips that can be used to provide inputs to an oscilloscope or other measuring instrument. Further data conducting light guides may also be utilized to read and conduct data to or from circuitry including storage devices such as memory chips.

Exemplary arrangements can also support the activities of users in learning a programming language. This may be done for example by setting self programmed routings in motion and outputting images.

For medical applications utilizing the principles of the exemplary arrangements, infrared laser light that may be transmitted and received through the light guides can be used for numerous different purposes. Such purposes may include detection of a temperature, position, distance or other measurable property associated with a patient. For example in some arrangements the patient may place a hand or other extremity in a recess which is been presented for purposes of capturing data through the conductive properties associated with a plurality of light guide matrix elements. Properties such as the pulse, blood pressure, skin resistance and other measurable properties can be sensed and recorded based on the detected displacement of the light guides and sensing of the detectable electrical properties. Of course electrically conducting light guides may be utilized for detecting numerous different properties associated with patients.

Several devices utilizing the principles discussed herein can be used by being segmented at different vertical levels. For this purpose devices can be individually height adjustable on telescopic rails or similar structures. Such rails may be attached to structures similar to lifting rams or other devices that provide selective vertical movement. For example a staircase like display surface which is illuminated using a projector, can be constructed with several display devices. In such arrangements suitable circuitry with projection mapping software may be utilized. Of course these approaches are exemplary and in other arrangements other approaches may be used.

FIGS. 10 through 17 show an arrangement 200 having an exemplary light guide 202 which extends in a cylinder 204. This arrangement is used for perforated plates 206, 208, 210, 212, which provide for locking of the light guide 202 in position by a piezoceramic ring stack 214 located inside the cylinder 204, spring-loaded on a piezoceramic ring stack through a small thickening or similar structural feature for engaging the spring 216. Spacers 217 separate adjacent plates 206-212 from each other. Note that plate 212 can be a mirror.

To register touch, position and/or pressure, or alternatively to emit or record fine small movements such as displacement of the light guide, signals are generated by the piezoceramic ring stack 214. The signals may be utilized to record and reproduce touch inputs. In this way, large area effects and additional movement effects can be achieved.

In exemplary arrangements the control of light guides 202 may work similarly to a machine for setting up a cone. A perforated plate 206 that can be adjusted at a first side by a servo motor, for example, with the second holes being bordered with piezoceramics to enable holding and releasing the light guides 202. Such an approach may be used to lift individual or multiple light guides to a higher level in a controlled manner.

For this purpose certain light guides 202 can be locked in position by the second piezoceramic and the entire perforated plate 206 may be lifted by servomotors or other suitable actuators.

Further in other arrangements a second, non-height adjustable perforated plate 212, a third piezoceramic perforated plate 210 may be utilized to obtain a further level.

In exemplary arrangements while a fourth height adjustable perforated plate 210 fixes and lifts one or more light guides 202 through a ring-shaped piezoceramic stack 214, the stationary third piezoceramic perforated plate 212 serves to fix selected light guides 202 as a brake so that the height adjustable fourth piezoceramic perforated plate 210 releases the light guides 202 again.

A contoured relief can be produced responsive to circuit operation. In some exemplary arrangements, a device may be provided in which a 3D relief button actuated by a user may be operative when touched to retract or extend the programmed relief.

In some exemplary arrangements the light guides may be configured within respective cylinder sleeves. Such an arrangement works with stacked piezoceramic rings similar to braille devices utilized by the blind, in order to record pressure and to enable the provision of inputs in a manner similar to a touchscreen. Further in some arrangements the movement of the light guides may be fine-tuned for purposes of detection of small stroke displacements. Of course these approaches are exemplary and in other arrangements other approaches may be used.

Figure 10:
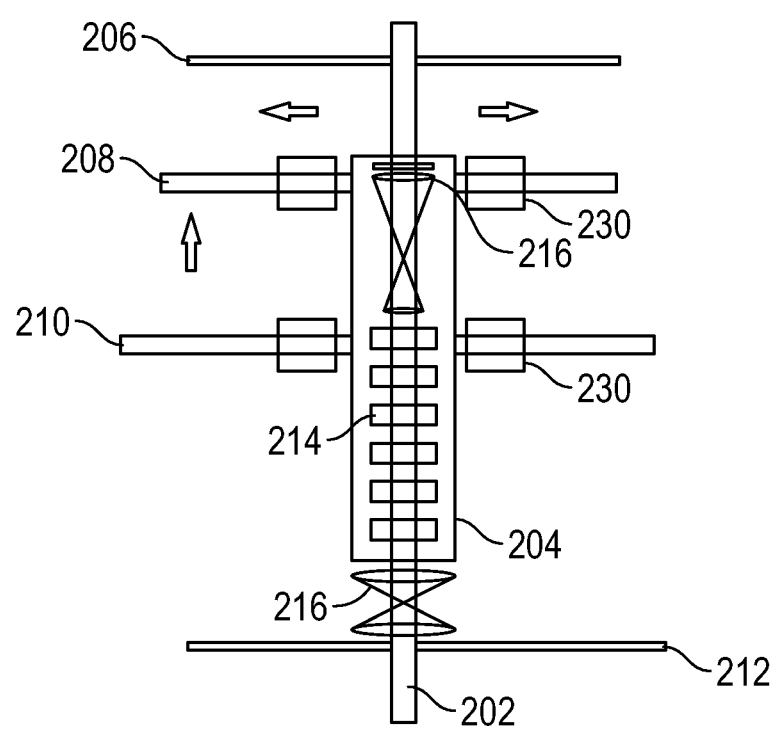
FIG. 10 shows a schematic representation of a piezoceramic device between several perforated plates.
Figure 11:
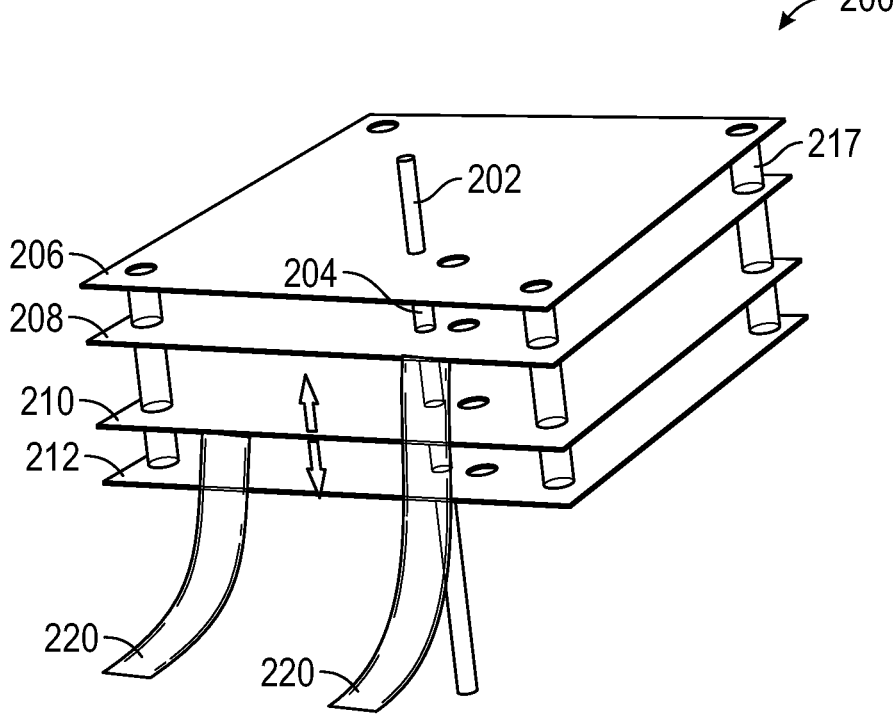
FIG. 11 shows a perspective schematic view of the device arrangement shown in FIG. 10.
Figure 12:
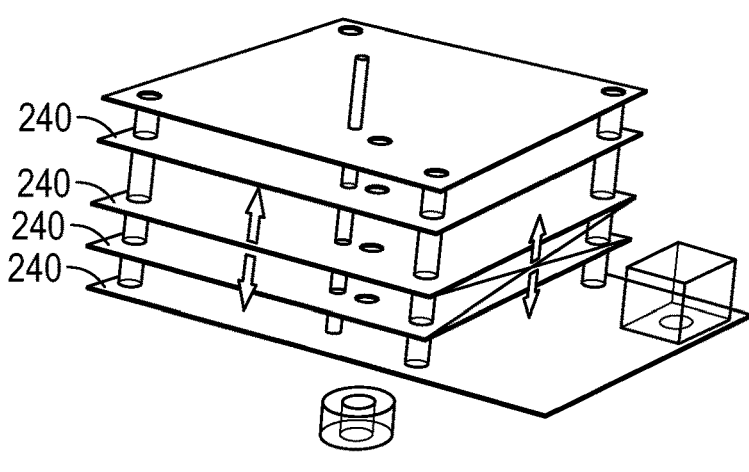
FIG. 12 shows a further arrangement which may be utilized in providing visual representations of audible outputs.

FIGS. 10 through 12 show a light guide 202 which is inserted in a cylinder 204. This arrangement is used with perforated plates 206-212 with locking by a piezoceramic stack 214 and is located inside the cylinder 204, sprung on a piezoceramic ring stack 214, and held by a small thickening or similar structure in order to register contact, position and pressure strength. Alternatively an arrangement of this type is enabled to selectively detect small axial movements of each light guide 202. Such arrangements enable data to be captured and stored through suitable circuitry. Such data may be played back and used to reproduce the outputs generated through displacement of the light guides.

As shown in FIG. 10, the light guide 202 and cylinder 204 are connected to one another in a spring-loaded manner via spring 216. This provides for pre-tensioning of the spring 216 inside the cylinder 204 (piezo property), which presses on the piezoceramic or the ring stack 214.

On the side of the exemplary cylinder there are contact strips 220 that deliver and/or receive signals to or from the conductor tracks that are in or on the perforated plates 206-212. The light guides 202 are located inside the cylinder 204 through a small thickening or other similar structural features.

A display device utilizing features of the exemplary arrangements may be utilized in connection with playing a game. In such arrangements the device may be connected to a controllable frame and the display device may be positioned in a vertically extending position. In an exemplary arrangement, shown in FIG. 16, a 3D relief graphic image 390 corresponding to a human head prompts a player through visual and audible outputs to play games with him. After receiving audible signals corresponding to verbal approval, the display shows a countdown both visually and as a 3D relief. After the countdown the device is automatically adjusted to a horizontal position through movement by one or more actuators of a controllable underlying frame.

Thereafter the display device, through its ability to move, may perform a function such as lifting of a robot ball. The display may give the player the robot ball with graphics and underpainting. This is done after the ball is first place in a designated location. Then a 3D contoured relief course is set up in which for example, the aim is not to touch a lateral boundary in order to obtain points. A player may develop skills by controlling ball movement.

Devices utilizing the features of the exemplary arrangement are also able to display heights and distances. For example in some arrangements exemplary displays may provide visual indications of flight routes and altitudes of aircraft. Such altitudes and routes may be indicated through the extended displacement of selected light guides. Such arrangements may be useful in displaying overlapping airplane routes with different altitudes. Of course these approaches are exemplary of the types of information that can be visually presented through displays which utilize the principles that have been discussed.

Figure 13:
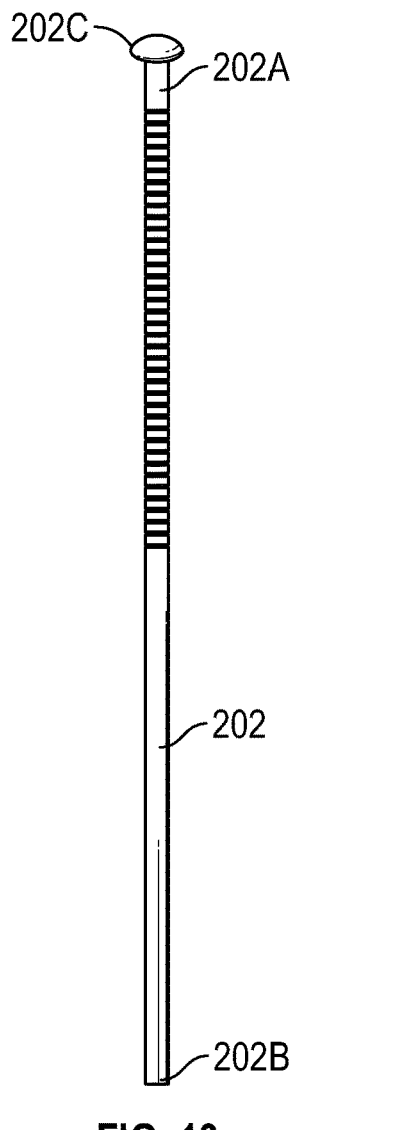
FIG. 13 shows a side elevational view of an exemplary light rod.
Figure 15:
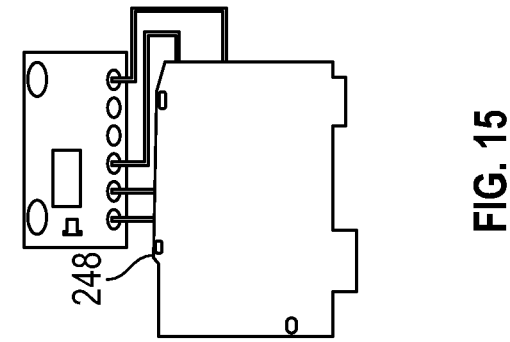
FIG. 15 shows a controller used with the arrangement of FIG. 14.
Figure 14:
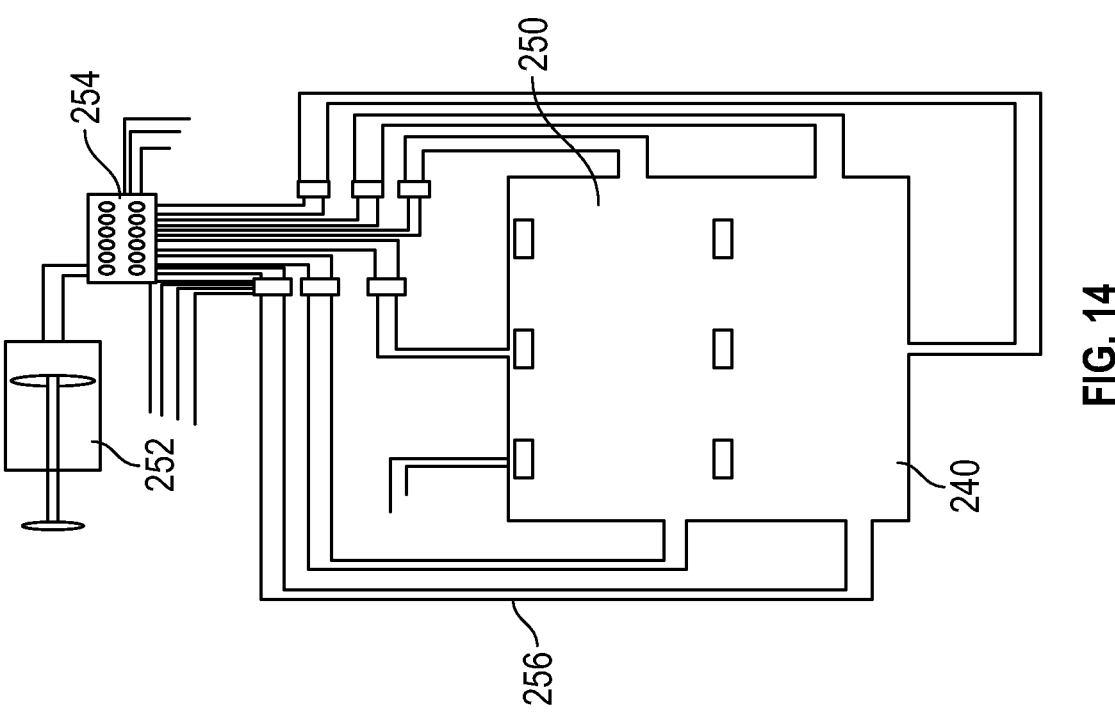
FIG. 14 shows a schematic view of an arrangement using transparent air bags.
Figure 16:
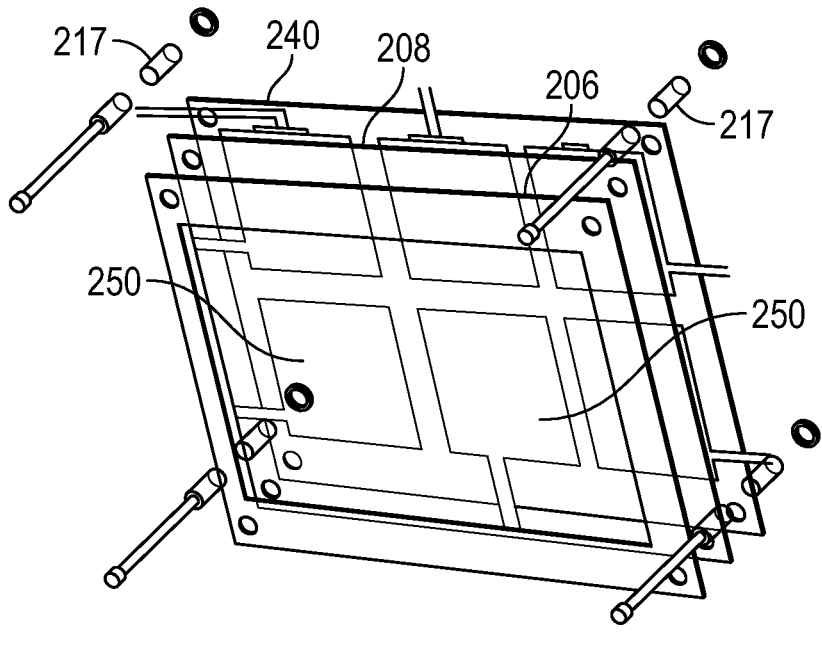
FIG. 16 shows a perspective exploded view of the arrangement of FIG. 12.
Figure 17:
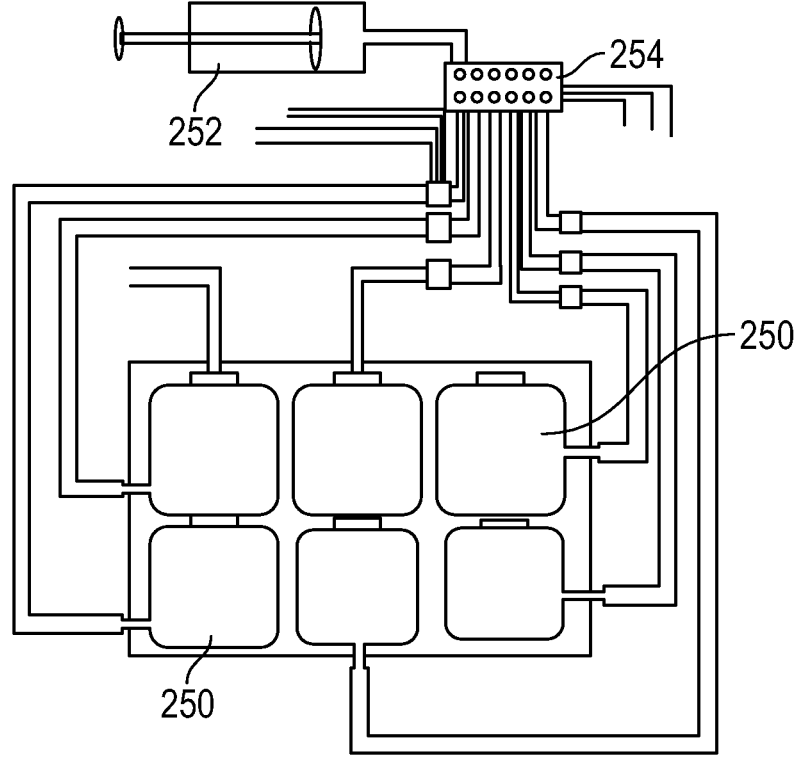
FIG. 17 shows a schematic view of the arrangement of FIG. 12.

Referring now to FIG. 13, the light guides 202 may have one end 202A that lies on the projection side and opposite end 202B that lies on the display surface side. The end on the projection side 202A may have an enlarged surface area 202C to capture more image content or light. The end of the light guide 202 on the display side 202B may similarly be enlarged so as to provide a display surface which has less intermediate space between adjacent light guides 202. Thus in exemplary arrangements more background imagery may be provided.

Some exemplary arrangements that employ the principles that have been described herein may provide a device that includes an input end that has the display of a smart phone or similar display device positioned adjacent thereto. The light guides can then receive and transmit the image produced by the smart phone display as an output including as a moving video. The information may be output visually and/or analyzed through suitable circuitry to control the device. Such outputs may also be utilized to provide an optical fiber interface with the display of the smart phone device. Of course such principles may also be utilized in connection with other types of visual output devices.

In some exemplary arrangements additional types of moving relief outputs can be provided through the use of pneumatic elements and circuitry. FIGS. 14 through 17 schematically represent a system 200 including transparent elements 240 that are selectively movable responsive to being supplied with pneumatic pressure. Pneumatic pressure is supplied responsive to control circuitry 248 (shown in FIG. 15) and suitable air delivery and relief valves from an air source 252 via control valves, such as solenoid valves 254 that are connected to menumatic elements via air hoses 256. Such arrangements may include transparent air cushions 250 or other similar expandable and retractable elements that may be selectively operated to move and produce controlled visual outputs at different locations relative to the point of view of the user. Further in exemplary arrangements visually perceivable content may be output from visual output devices positioned behind such transparent elements. The selective delivery and release of pneumatic pressure within such elements is operative to cause portions of the displayed viewable content to appear to move in ways that are similar to those achieved by the movable light guides previously discussed. Thus exemplary arrangements may include circuitry that provides coordinated movement of the outer surface areas through which the user perceives the visual content. Such selected movement of the surfaces which may be outer surfaces of transparent air cushions or other movable transparent elements, may provide the desired contours and movement that correspond to the projected visual outputs.

For example in some arrangements the selected delivery and release of air pressure to the transparent air cushion elements may achieve the perception of movement of a static graphic image. In other exemplary arrangements moving graphic images such as video may have three-dimensional contours applied over portions thereof so as to provide enhanced graphical representations. Alternatively in some arrangements transparent air cushions may be used to move and position light guides of the types previously discussed. Numerous approaches may be achieved using the exemplary arrangement shown and described.

Figure 18:
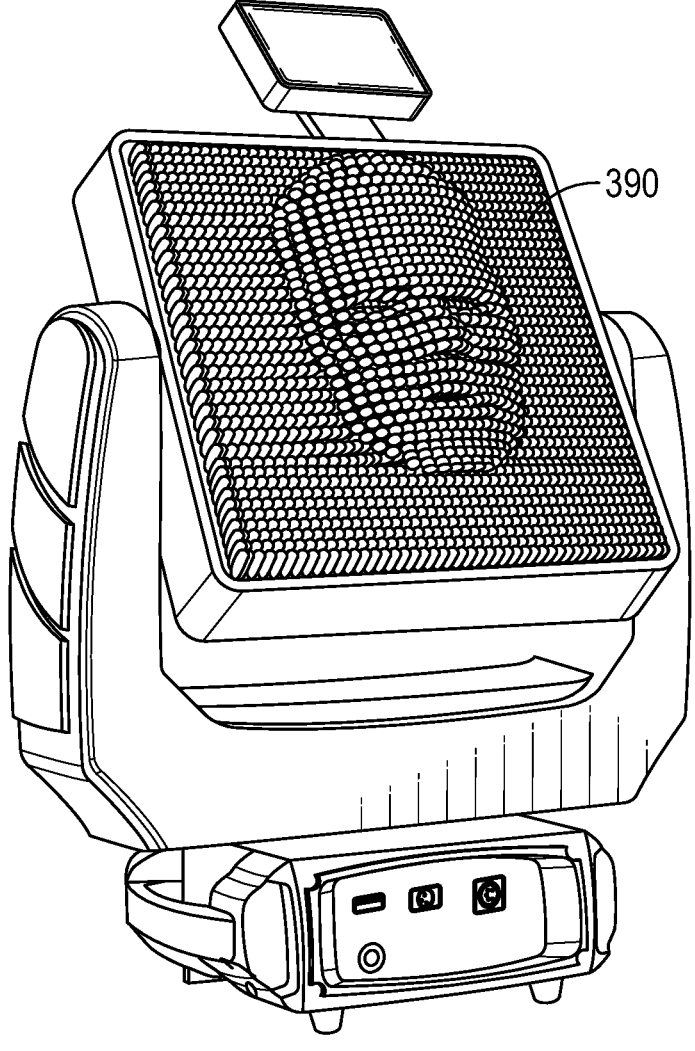
FIG. 18 shows an exemplary arrangement of a 3D display which provides articulated movement.
Figure 19:
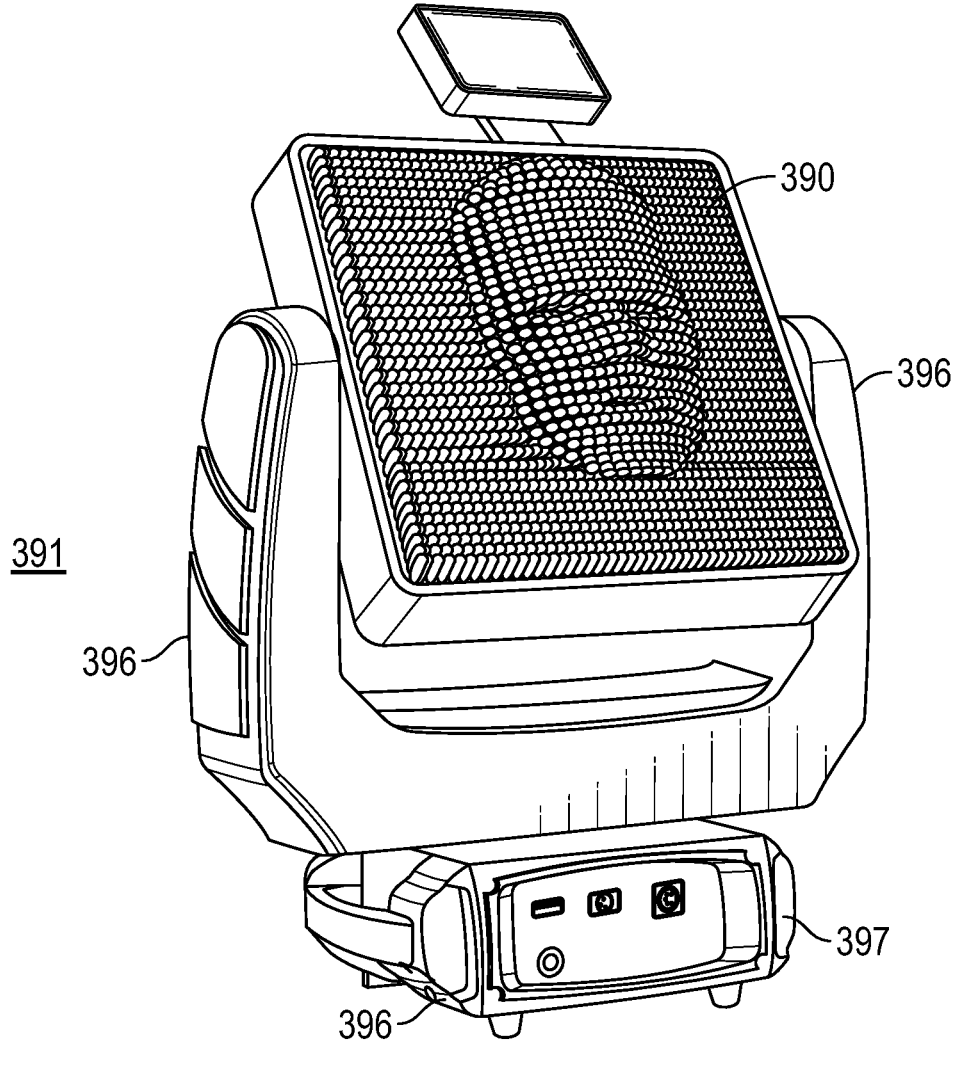
FIG. 19 is another view of the 3D display of FIG. 18.
Figure 20:
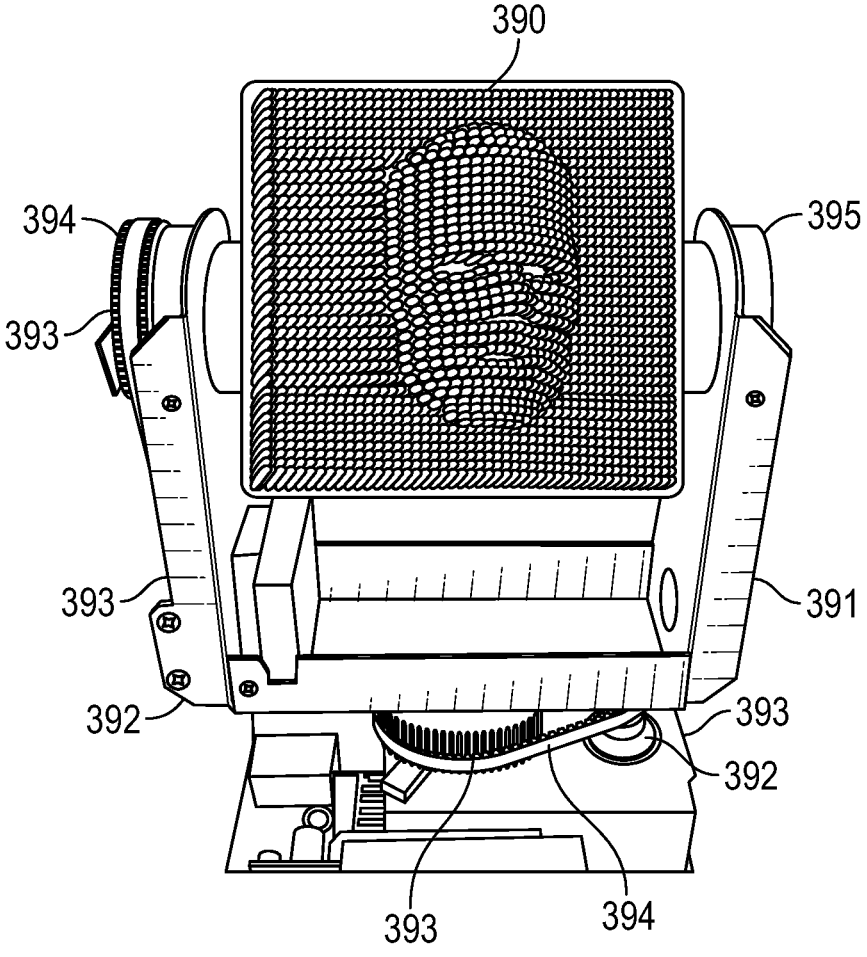
FIG. 20 is a front elevational view of the 3D display of FIG. 18.
Figure 21:
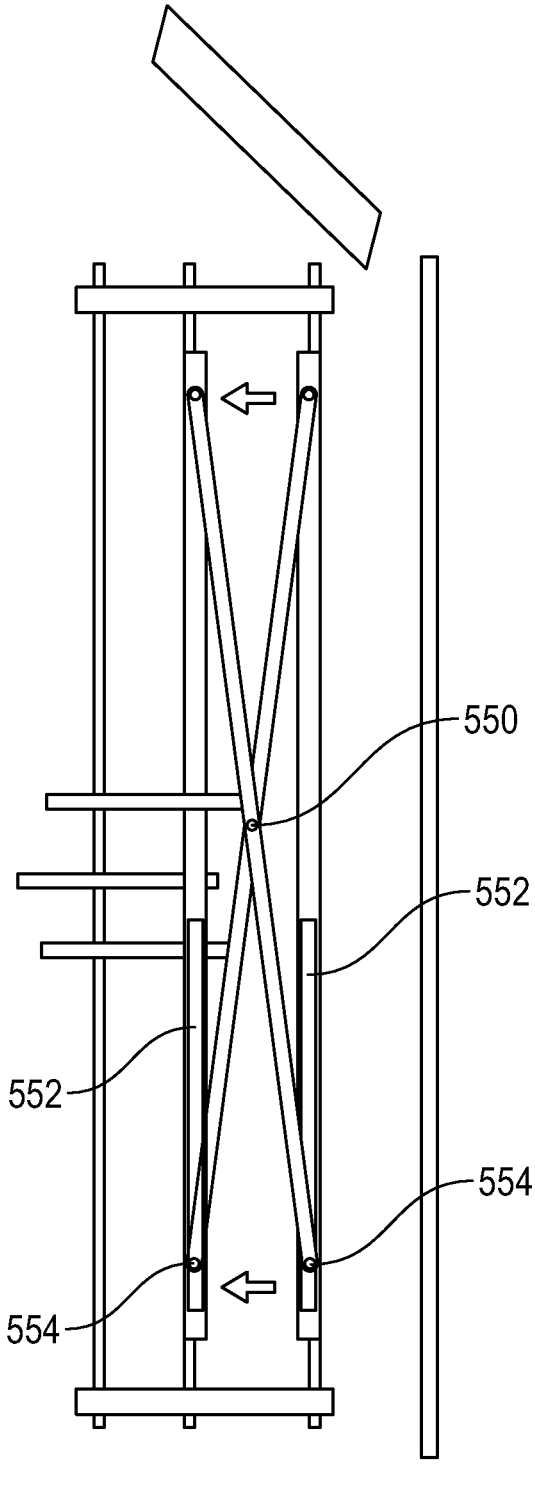
FIG. 21 is a side elevational view of a display using a scissoring mechanism to space apart shadow masks.

FIGS. 18 through 25 show a 3D display that provides articulated movement. As shown in FIG. 18, the display includes a matrix of movable light guides that are selectively positionable outwardly to produce three-dimensional images such as for example, a representation of a human face. As shown in FIGS. 19 and 20, the exemplary display further includes a suspension 391 with motors 392 gears 393 timing belts 394, bearings 395, and other suitable actuators such that the matrix of light guides is selectively rotatable about a horizontal axis between a pair of horizontally disposed upward extending supports 396 of suspension 391. The suspension 391 is further selectively rotatable about a vertical axis on a base 397. Suitable circuitry is utilized for positioning the display 390 relative to the base 396. This ability to move the display 390 can be used to create the perception of the face or other object that is presented on the display being in facing relation with the user. As can be appreciated in exemplary arrangements the output surface of the display 390 may be rotationed throughout a 360° range within the suspension 391 and also in a 360° range relative to the base 397. This provides for exemplary arrangements that are capable of positioning the display outputs in any direction as may be desirable for the particular outputs that are being presented.

Figure 22:
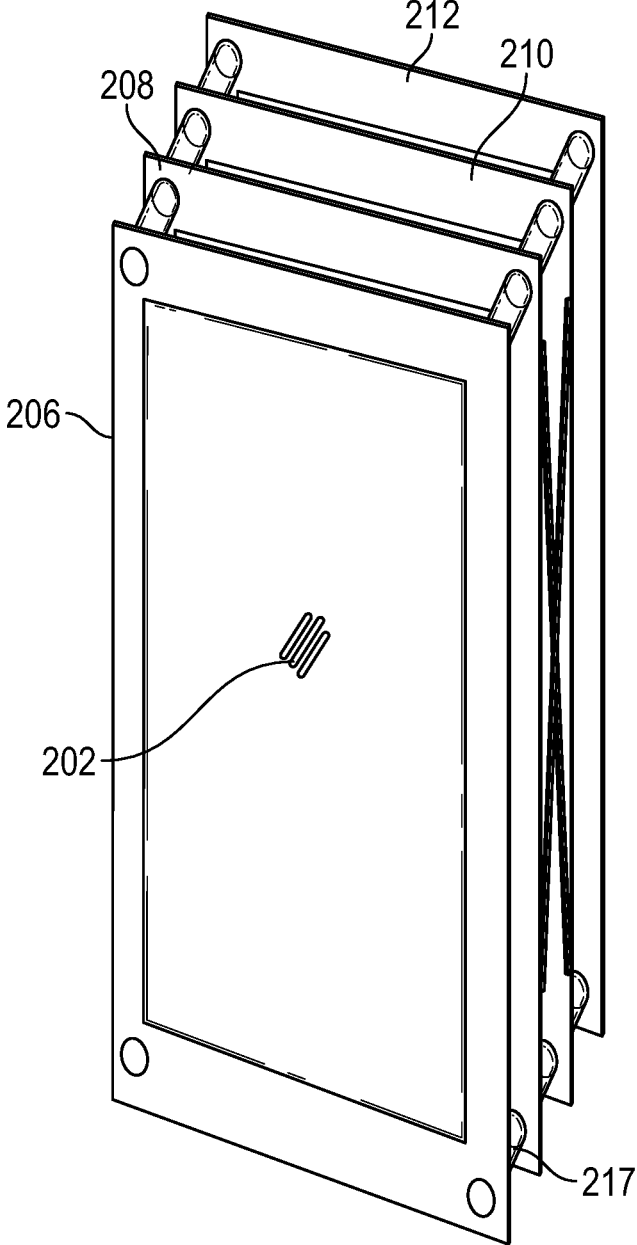
FIG. 22 is a perspective view of the display of FIG. 21.

FIGS. 21-25 show the construction of alternative exemplary displays. These may include features like those previously described in connection with other arrangements. Referring to FIG. 22, instead of a pneumatic actuator 250 to move the plates as discussed above, a scissoring mechanism 550 can be used. Guide rails 552 are attached to adjacent plates 208, 210 and ends 554 of scissoring mechanism 550 are slidingly disposed in guide rails to allow ends 554 of scissoring mechanism 550 to slide there in to expand or contract scissoring mechanism and adjust the spacing of plates 208, 210 relative to each other.

Figure 23:
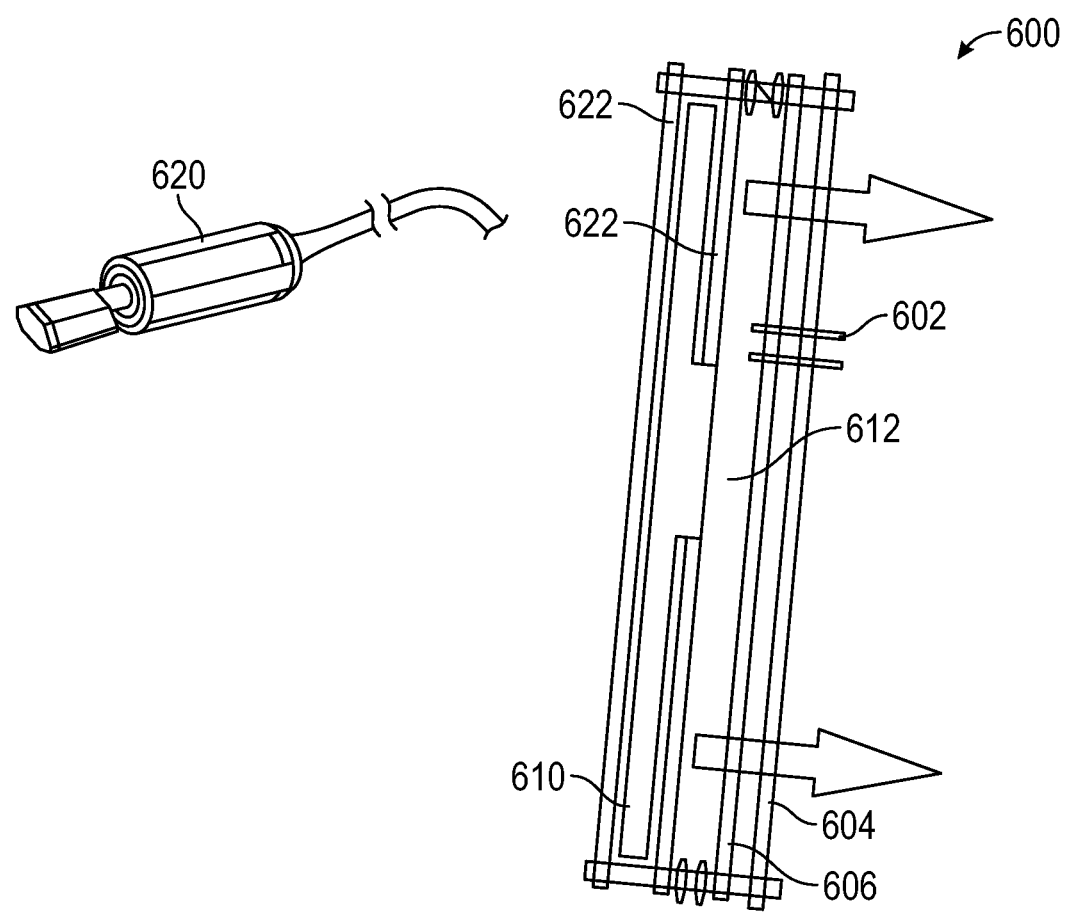
FIG. 23 shows an alternative actuator arrangement that may be utilized for selectively moving light guides and/or in connection with determining the axial positions of light guides.

FIG. 23 uses an embodiment 600 that incorporates 60 bladders and a vibration motor 620 to move a transparent plate 622 with light rods 602 mounted in adjacent plates 604, 606. A transparent air bladder 612 is mounted behind plate 606.

Figure 24:
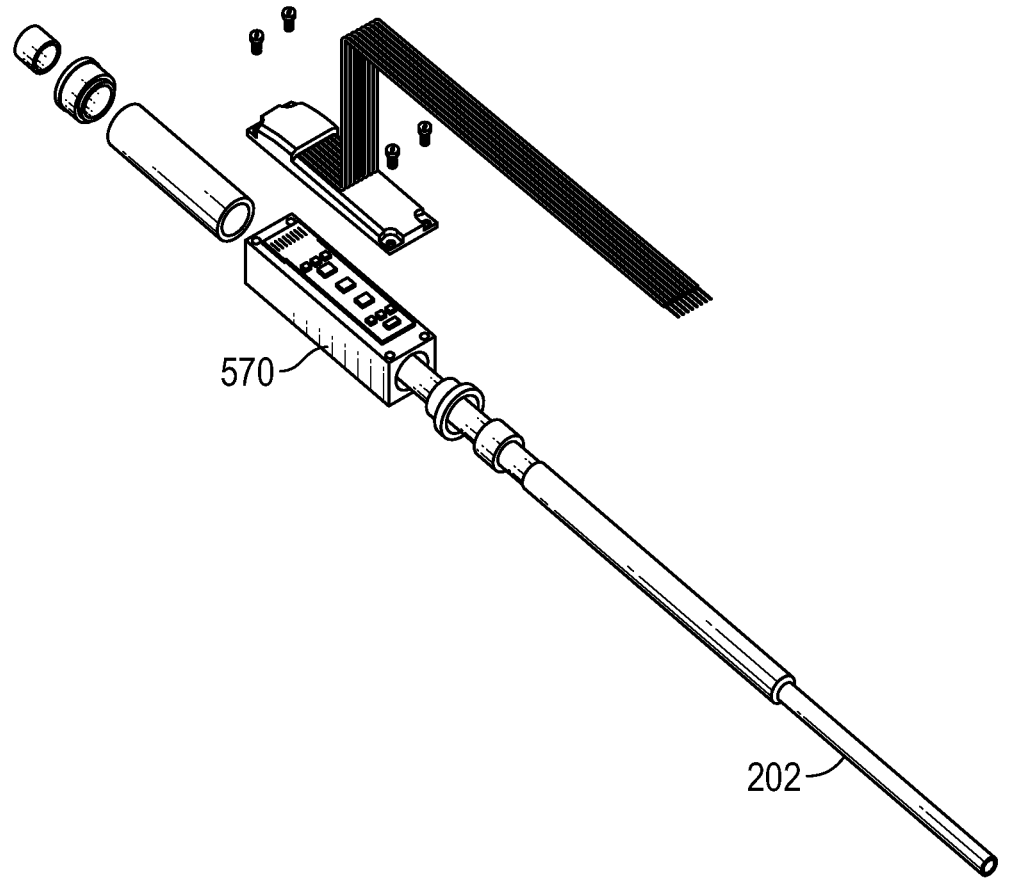
FIG. 24 shows another alternative actuator arrangement that may be utilized for selectively moving light guides and/or in connection with determining the axial positions of light guides.

Further in some arrangements light guides may be selectively axially positioned through the use of magnetic servomotors 570 coupled to a light rod 202, like those shown in FIG. 24. The exemplary arrangement that is provided may include a matrix of selectively movable light guides 202. Suitable projectors and mirrors are utilized for generating the images that are produced and transmitted through the light guides. Suitable circuitry is utilized to position the light guides relatively outwardly so as to provide the desired contours that are coordinated with the presented image data.

Further in exemplary arrangements the surfaces utilized for providing outputs may be selectively positioned through the use of suitable actuators. This may include actuators that move the supporting base of the display relatively inward and outward. Further in exemplary arrangements suitable linear actuators may be provided for moving display components or other items which are utilized in connection with presenting the images. In addition in some arrangements the movable actuators may include electrical actuators or pneumatic actuators. In addition, exemplary displays may also have the light guides 202 in operative connection with vibration producing motors 580 or other devices that achieve cyclical movement when desired. This may be accomplished for example in connection with visual outputs that are static, when it is desired to create the perception of movement relative thereto. While electric motors with oscillating members can be utilized for providing vibratory movement of light guides in some arrangements, in other arrangements the structures that utilize pneumatic actuation may be used to achieve vibratory movement through the application of repeated cyclical pressure fluctuations. For example static images of water may be caused to appear to include waves by actuation of one or more vibration motors or similar devices. Numerous different effects may be achieved through the use of the structures shown in connection with these exemplary arrangements.

Figure 25:
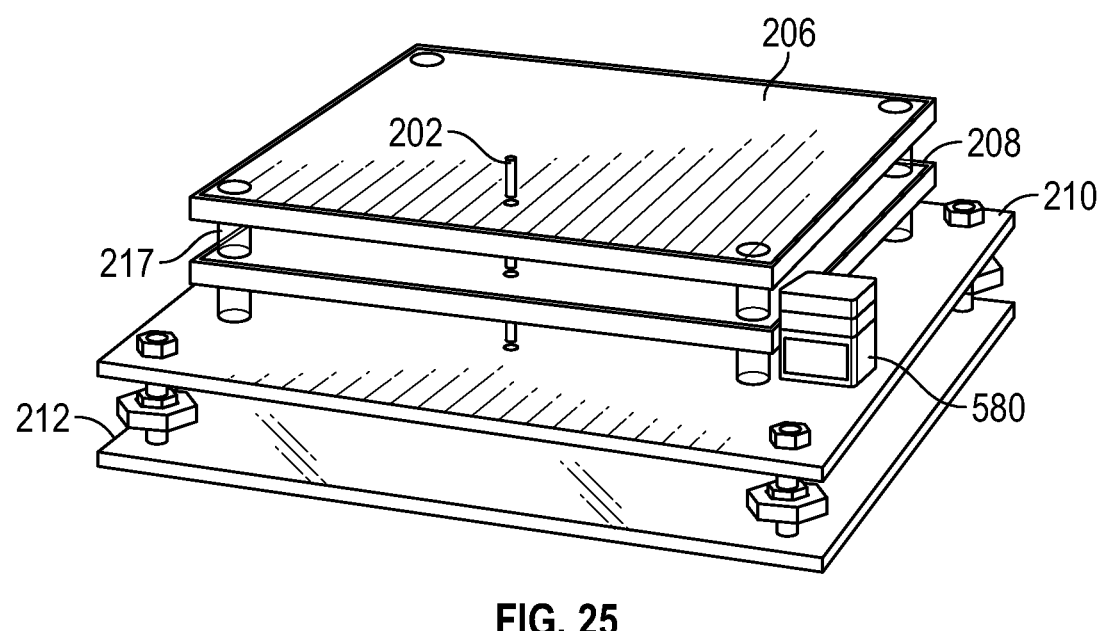
FIG. 25 shows a device which may be utilized to provide visual outputs that correspond to and that may be correlated with audible outputs such as music, to provide a user with an enhanced multisensory experience.
Figure 26:
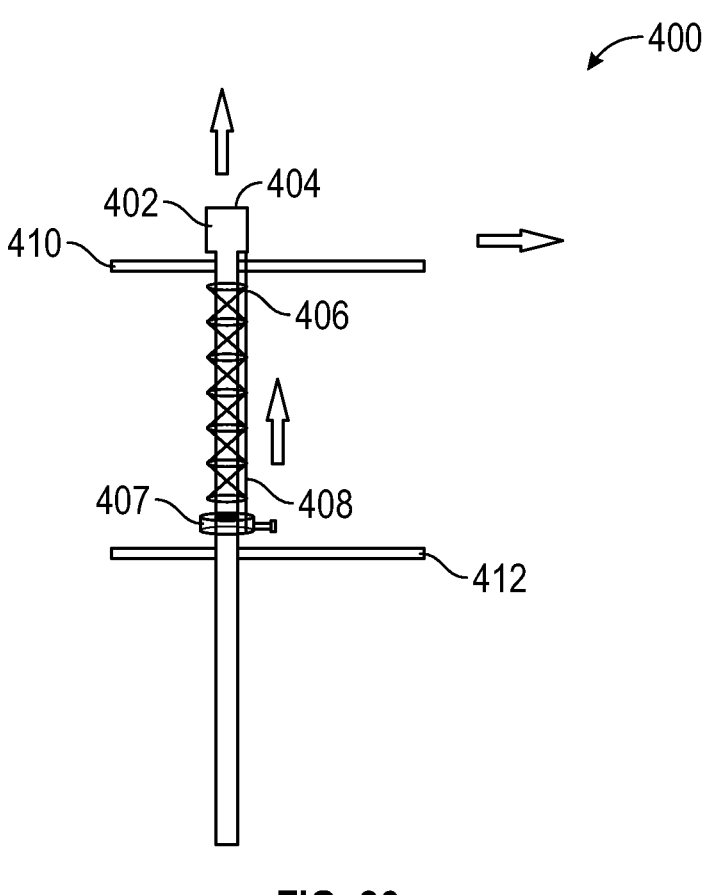
FIG. 26 shows a side view of a light guide rod held between two perforated plates.
Figure 27:
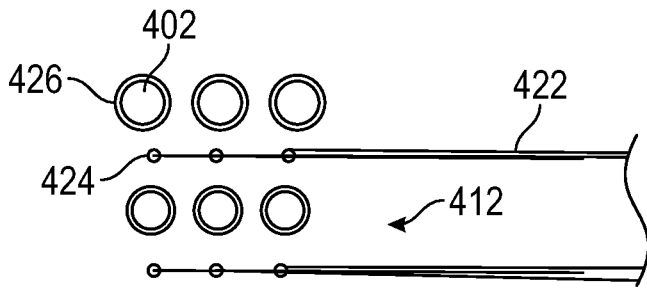
FIG. 27 shows a top view of the light guide rod shown in FIG. 10.
Figure 28:
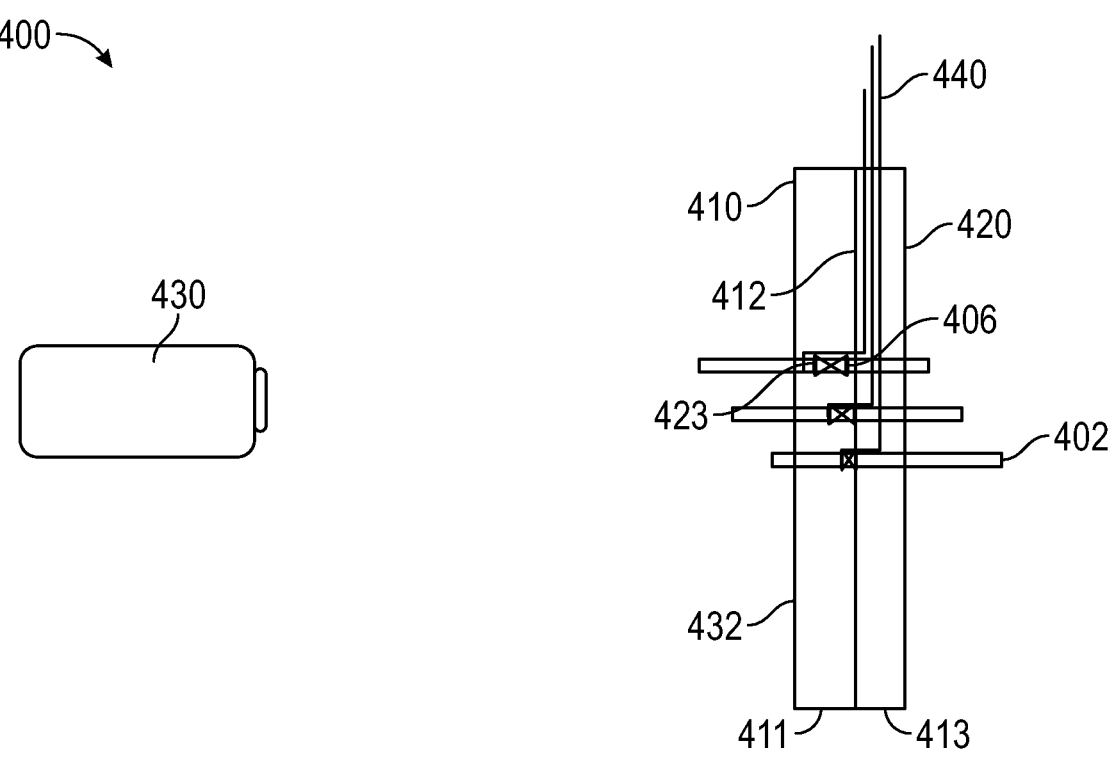
FIG. 28 shows a matrix with several light guide rods.
Figure 29:
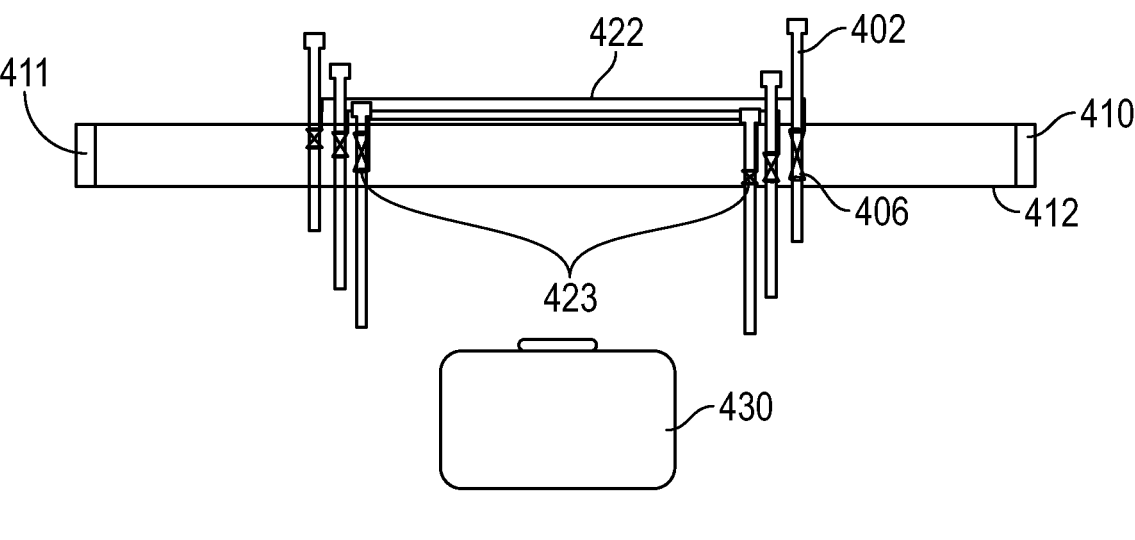
FIG. 29 shows the connection of a matrix as output relief with a further matrix as input relief over threads.

Referring to FIG. 25, other exemplary arrangements may be utilized to provide three-dimensional outputs that correspond to audible signals from a vibration speaker 580. For example in some arrangements audible signals that correspond to music may have corresponding electrical signals that are conditioned and/or transformed into selected electrical signals that are utilized to move selected light guides into different positions. Exemplary circuitry may move different light guides based on electrical signals corresponding to certain audible parameters. These may include parameters such as frequency, volume, tempo or other sound properties which are used to produce selected outward and timed movements of light guides that correspond to the audible signals.

Further in exemplary arrangements suitable circuitry may operate to cause the illumination of LEDs or other output devices in correlated relation with selected parameters of the audible signals. This may include for example providing selected output colors in various locations of the display responsive to one or more sensed musical parameters. Thus in exemplary arrangements 3D outputs may be provided in correlated relation with audible signals such as music which may include correlated coloration outputs that correspond to the musical parameters. This may provide a visual output that enhances the multisensory experience of the user while listening to the audible outputs. Further exemplary circuitry may be operative to automatically shift the factors used for correlation between the movement of the light guides and/or the coloration outputs between different parameters over time. This may be done to avoid the visual outputs from being repetitive in connection with audible signals that may undergo periodic repetition.

FIG. 25 shows an exemplary arrangement of a device which provides audio frequency visualization of audible outputs. In exemplary arrangements light guides are selectively moved in correlated relation with the audible outputs from a speaker. Further coloration and symbolic outputs that are projected behind the light guides are changed in accordance with the audible signals.

Referring to FIGS. 26-32, one embodiment 400 has an input device where an object is sensed by means of a raised relief with compression springs and/or strain gauge sensors. Individual control of the light guides 402 can be achieved using a piezoceramic, a ring sensor, or a Hall sensor for a linear actuator. This enables a visually perceptible positive relief output.

Suitable linear actuators 410 for a movement of the rods 402 include pneumatic and hydraulic actuators, laser light, linear motors, or mechanical devices such as a string that pulls on the rod and is rolled up, for example, while the rod 402 exerts a restoring force as an air cushion or spring, for example.

The rods 402 may be round, but may also have other cross-sections, such as hexagonal, square, and with or without a head 404 as an enlargement at one end. The rods 402 can be current conducting and clear or opaque.

The side of the multiplicity of pins 402 that shows the projected image should not be polished for better imaging. The smaller the diameter of the pins 402, the better the resolution when the pins 402 are close together.

The device 400 is preferably powered by a 12 V power source and, especially in the USA, also by 5 V via a USB port.

The reliefs of the input and output reliefs shown in FIGS. 26-32 consist of slidable rods 402, each supported in at least one shadow mask 410.

The input element (control element) also consists of a matrix of rods supported in perforated plates.

The rods 402 are held up by springs 406 attached to the rods 402 above the center so that the rods 402 form a raised matrix.

A user can, for example, place his hand on the matrix which is then displayed as a positive relief on the output element.

Controlling rods 402 that are movable in shadow masks to image a relief becomes increasingly difficult the higher resolution a relief is to be, because the rods 402 must be smaller and smaller.

The invention makes it possible to generate a programmed motion sequence here.

For this purpose, preferably transparent nylon cords 408 are attached to the movable rods 402, which are routed like control lines of an airplane and deflected to connect cords 408 to a control element.

The input element (control element) also consists of a matrix of rods 402 mounted in perforated plates 410, 412, forming an input relief.

The rods 402 are held up by springs 406 attached to the rods 402 above the center so that the rods 402 form a raised matrix. A ring lock 407 on control rod 402 between plates 410, 412 prevents control rod 402 from settling too low with respect to plate 412.

A user can e.g.: place his hand on the matrix, which then displays as positive relief on the output element.

The input element can be connected for automation with linear actuators e.g. servo motors, linear motors, 3D gantry etc. to be able to display programmed sequences on the display element.

A third perforated plate 420 of the display element serves as a cover for control lines 422 (nylon cord) that are attached to each rod 402 at a fastening location 423. The second perforated plate 412 shall have small guide holes 424 for the nylon cords 422 in addition to the holes 426 for fiber optic rods 402. Spacers 411, 413 are disposed between plates 410, 412 and 412, 420 to maintain a space between plates 410, 412, 420.

A projector 420 projects light or an image onto a rear of a projection surface 432 on second plate 412

Figure 30:
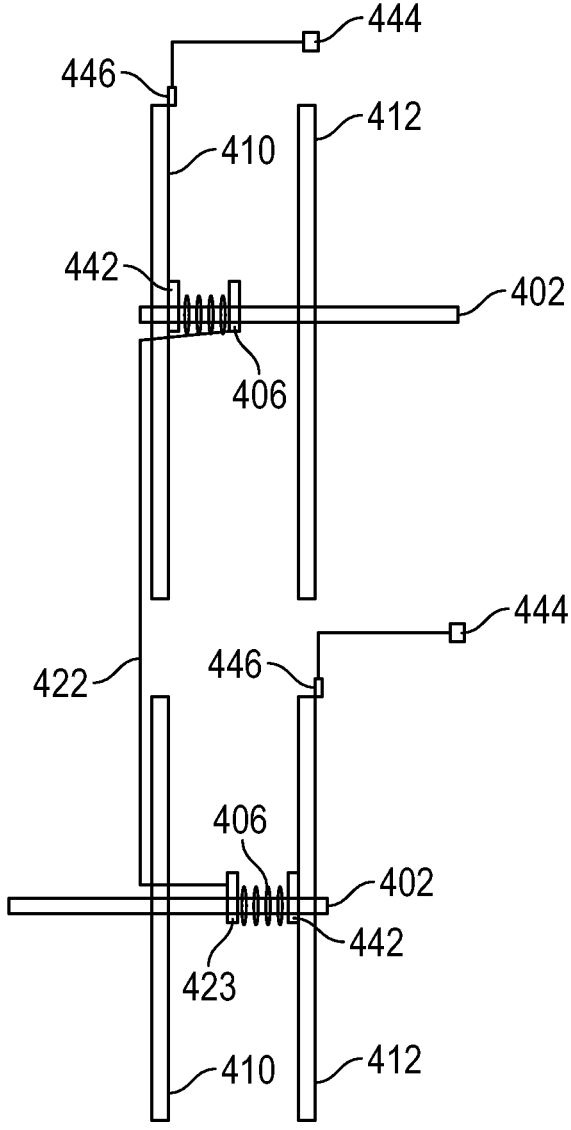
FIG. 30 shows a magnified view of an output light guide rod with an input light guide rod.
Figure 31:
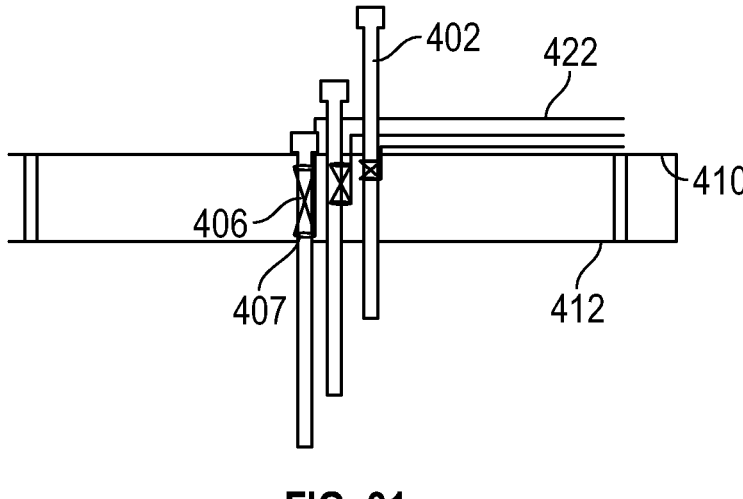
FIG. 31 shows the fastening of an output light guide rod in the matrix.
Figure 32:
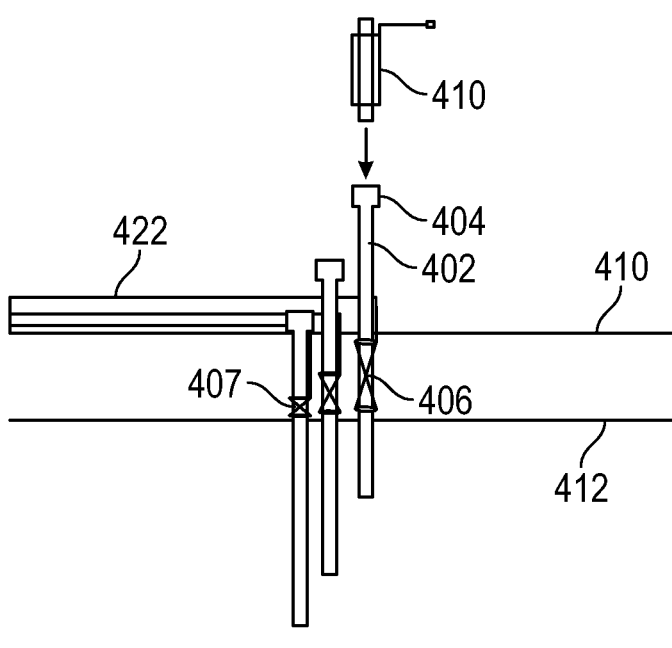
FIG. 32 shows the interaction of an electric linear motor with a light guide rod.

FIG. 30 shows a system of a bottom arrangement and a corresponding top arrangement. In this system, pressure can be applied to the bottom of the rod 402. The rod 402 then moves from left to right as shown in the Figure. The thread 440, shown in FIG. 28, causes the rod 402 at the top to move from right to left. Sensors and piezo actuators can also be used instead of the thread 440. Thus, at the bottom, a pressure sensor 442 can transmit a signal to connector 444 via connector 446 on the circuit board. This information is then used to transmit the signal to the actuator at the top via connection 444 and connection 446 on the circuit board to move the rod 402 accordingly.

Accordingly, the signal can also be detected at the top via a sensor and cause a movement of the rod 402 at the bottom.

A powerful relief, which is cheaper to manufacture, can transmit input without requiring electrical power but locally (similar to a typewriter). In contrast, light guides directly driven by linear motors installed in or between the perforated plates require more space, are very complex and expensive to develop, and are less powerful).

Of course while certain parameters associated with musical compositions have been described as being used to determine the visual outputs in the exemplary arrangements, in other arrangements suitable videos, patterns or other graphic representations may be utilized. In certain exemplary arrangements the graphics may be selected to have a relationship with the subject matter of the audible outputs. Such correlation may provide the user with a greater understanding or appreciation of the particular musical composition that is presented. Further in exemplary arrangements programmable circuitry may be utilized so that the user can select the particular nature of the three-dimensional and/or visual outputs that are provided from the display in correlated relation with the audible signals. Of course it should be understood that these approaches are exemplary and in other arrangements other approaches may be used.

Thus the exemplary arrangements achieve greater benefits and capabilities compared to prior devices and systems, and attain the useful results described herein.

In the foregoing description certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the new and useful features and relationships are not limited only to the arrangements of features and relationships that have been shown and described.

It should be understood that features and/or relationships associated with one arrangement can be combined with features and/or relationships from another arrangement. That is various features and/or relationships from various arrangements can be combined to produce further useful arrangements. The inventive scope of this disclosure is not limited only to the arrangements that have been described herein.

Having described features, discoveries and principles of the exemplary arrangements, the manner in which they are constructed and operated, and the advantages and useful results attained; the new and useful features, devices, elements, arrangements, parts, combinations, systems, equipment, operations, methods, processes and relationships are set forth in the appended claims.

I claim:

1. A first device for displaying three-dimensional images, comprising
    a plane in which a plurality of pins are movably arranged as light guides perpendicular to the plane, one side of the plurality of pins representing the image;
    an imaging device, characterized in that the imaging device is a projector or a screen for projecting an image onto the other side of the plurality of pins; and
    a plurality of output optical fiber rods guided parallel to each other in a matrix and forming an output relief, characterized in that the output optical fiber rods are each connected to a thread associated with an actuator.

2. The device according to claim 1, characterized in that pins are held in a first and in a second aperture mask spaced therefrom and in that it comprises a third aperture mask which is slidably mounted relative to the first and to the second aperture mask in order to fix the pins in a position.

3. The device according to claim 1, characterized in that the device comprises electromagnets to move the pins.

4. The device according to claim 1, characterized in that the device comprises at least one of springs, rubber elements, and a rubber or foam mat to press the pins into an initial position.

5. The device according to claim 1, characterized in that the device comprises pins with a polygonal cross-section.

6. The device according to claim 1, characterized in that the pins have a pressure sensor on one end face.

7. The device according to claim 1, characterized in that the pins each comprise at least one ferromagnetic sleeve.

8. The device according to claim 1, characterized in that the pins are connected at one end face to a rubber foil stretched over the pins.

9. The device according to claim 1, characterized in that the device comprises a mirror via which the image is projected.

10. The device according to claim 1, characterized in that the device comprises a plurality of imaging means, arranged orthogonally to each other, for projecting onto the plurality of pins.

11. The device according to claim 1, characterized in that at least one of the imaging devices is a projector.

12. The device according to claim 1, characterized in that at least one of the imaging devices is a screen.

13. The device according to claim 1, characterized in that the device comprises a camera to detect the position and also comprises an image projected onto the pins.

14. The device according to claim 1, characterized in that the output light guide rods are resiliently connected to the matrix.

15. The device according to claim 1, characterized in that the matrix comprises two spaced perforated plates through whose holes the output light guide rods extend.

16. The device according to claim 1, characterized in that the thread is a nylon thread.

17. The device according to claim 16, characterized in that the nylon thread is transparent.

18. The device according to claim 1, characterized in that the actuator has a further matrix with input rods guided parallel to one another in the further matrix as input relief, the thread being connected in each case to an input rod and an output light guide rod.

19. The device according to claim 1, characterized in that the actuator has a control acting on at least one output optical fiber rod.

20. The device according to claim 18, characterized in that the actuator acts on an input rod which is connected via a thread to an output light guide rod in order to act on the latter.

21. The device according to claim 18, characterized in that the input rod is also a light guide rod.

22. The device according to claim 18, characterized in that the input rods are resiliently connected to the further matrix.

23. A method for operating two devices according to claim 1, characterized in that the changes in the position of the pins of one device simultaneously cause a corresponding change in the position of the pins of the further device.

\* \* \* \* \*